(12) United States Patent
Jannarone

(10) Patent No.: US 6,647,377 B2
(45) Date of Patent: Nov. 11, 2003

(54) MULTI-KERNEL NEURAL NETWORK CONCURRENT LEARNING, MONITORING, AND FORECASTING SYSTEM

(75) Inventor: Robert J. Jannarone, Atlanta, GA (US)

(73) Assignee: Netuitive, Inc., Alpharetta, GA (US)

( * ) Notice: Subject to any disclaimer, the term of this patent is extended or adjusted under 35 U.S.C. 154(b) by 95 days.

(21) Appl. No.: 09/829,018

(22) Filed: Apr. 9, 2001

(65) Prior Publication Data

US 2002/0016781 A1 Feb. 7, 2002

Related U.S. Application Data

(63) Continuation of application No. 08/974,377, filed on Nov. 19, 1997, now Pat. No. 6,216,119.

(51) Int. Cl.[7] .............................................. G06F 15/18

(52) U.S. Cl. ........................................... 706/16; 706/21

(58) Field of Search ..................................... 706/16, 21

(56) References Cited

U.S. PATENT DOCUMENTS

| 5,113,483 A | 5/1992 | Keeler et al. ................. 706/25 |
|---|---|---|
| 5,155,802 A | 10/1992 | Mueller et al. ................ 706/39 |
| 5,157,738 A | 10/1992 | Carpenter et al. ........... 382/157 |
| 5,170,463 A | 12/1992 | Fujimoto et al. .............. 706/41 |
| 5,214,743 A | 5/1993 | Asai et al. ..................... 706/31 |
| 5,222,194 A | 6/1993 | Nishimura .................... 706/25 |
| 5,241,509 A | 8/1993 | Jousselin et al. ....... 365/230.01 |
| 5,253,327 A | 10/1993 | Yoshihara .................... 706/19 |
| 5,253,328 A | 10/1993 | Hartman ...................... 706/25 |
| 5,274,746 A | 12/1993 | Mashiko ....................... 706/34 |
| 5,282,261 A | 1/1994 | Skeirik .......................... 706/23 |
| 5,303,385 A | 4/1994 | Hattori et al. ................. 700/50 |
| 5,311,421 A | 5/1994 | Nomura et al. ............... 700/37 |
| 5,313,559 A | 5/1994 | Ogata et al. .................. 706/25 |
| 5,367,612 A | 11/1994 | Bozich et al. ................. 706/23 |
| 5,396,415 A | 3/1995 | Konar et al. .................. 700/42 |
| 5,402,522 A | 3/1995 | Alkon et al. .................. 706/26 |
| 5,408,588 A | 4/1995 | Ulug ............................. 706/25 |
| 5,430,830 A | 7/1995 | Frank et al. ................... 706/25 |
| 5,448,684 A | 9/1995 | Holt ............................. 706/20 |
| 5,461,696 A | 10/1995 | Frank et al. ................. 704/232 |
| 5,469,265 A | 11/1995 | Measures et al. ........... 356/419 |
| 5,475,793 A | 12/1995 | Broomhead et al. .......... 706/14 |
| 5,479,575 A | 12/1995 | Yoda ............................ 706/20 |

FOREIGN PATENT DOCUMENTS

| EP | 0 557 997 A2 | 9/1993 |
|---|---|---|
| WO | WO 92/13306 | 8/1992 |
| WO | WO 96/14616 | 5/1996 |

OTHER PUBLICATIONS

Kaminski et al, "Kernel Orthonormalization in Radial. Basis Function Neural Networks", IEEE Transaction on Neural Networks, Sep. 1997.*

(List continued on next page.)

Primary Examiner—George B. Davis
(74) Attorney, Agent, or Firm—Michael J. Mehrman; Mehrman Law Office, P.C.

(57) ABSTRACT

A multi-kernel neural network computing architecture configured to learn correlations among feature values 34, 38 as the network monitors and imputes measured input values 30 and also predicts future output values 46. This computing architecture includes a multi-kernel neural network array 14 with the capability to learn and predict in real time. The CIP 10 also includes a manager 16 and an input-output transducer 12 that may be used for input-output refinement. These components allow the computing capacity of the multi-kernel array 14 to be reassigned in response to measured performance or other factors. The output feature values 46 computed by the multi-kernel array 14 and processed by an output processor 44 of the transducer 12 are supplied to a response unit 18 that may be configured to perform a variety of monitoring, forecasting, and control operations in response to the computed output values.

19 Claims, 10 Drawing Sheets

OTHER PUBLICATIONS

"Conjunctoids: Statistical Learning Modules for Binary Events," by R.J. Jannarone, K.F. Yu & Y. Takefuji, pp. 325–337, (Tech. Report 87–65). University of South Carolina Center for Machine Intelligence.

"Concurrent Information Processing, I: An Applications Overview," by Robert J. Jannarone, an invited paper in *Applied Computing Review*, pp. 1–6, vol. 1, No. 2, Fall 1993.

"Chapter 14: Conjunctoids and Artificial Learning," pp. 217–225 in *Neural Network Parallel Computing*, by Yoshiyasu Takefuji, ©1992 by Kluwer Academic Publishers, 101 Philip Drive, Assinippi Park, Norwell, Massachusetts 02061.

"Automated Real Time Neural Computing for Defense Waste Processing," by Yalin Hu, Dept. of Electrical and Computer Engineering, University of South Carolina, Columbia, SC 29208.

"Easy Bayes Estimation for Rasch–Type Models," by Robert J. Jannarone, Kai F. Yu, and James E. Laughlin, pp. 449–460, *Psychometrika*, vol. 55, No. 3, Sep. 1990.

"Extended Conjunctoid Theory and Implementation: A General Model for Machine Cognition Based on Categorical Data," by Robert J. Jannarone, Keping Ma, Kai Yu, and John W. Gorman, Chapter 13 in *Progress in Neural Networks, vol. III*, to be published in 1999.

"Concurrent Information Processing with Pattern Recognition Applications," by Yalin Hu, submitted in Partial Fulfillment of the Requirements for the Degree of Doctor of Philosophy in the Dept. of Electrical and Computer Engineering, College of Engineering, University of South Carolina, 1994.

"A Fast Kernel Algorithm for Concurrent Information Processing," by Aspi D. Engineer, submitted in Partial Fulfillment of the Requirements for the Degree of Master of Science in the Department of Electrical and Computer Engineering, College of Engineering, University of South Carolina, 1993.

"A Concurrent Information Processing Coordinator Package," by Kalpathi V. Ananthakrishnan, submitted in Partial Fulfillment of the Requirements of the Degree of Master of Science, Dept. of Electrical and Computer Engineering, College of Engineering, University of South Carolina, 1993.

"Real–Time Pattern Recognition, I: Neural Network Algorithms for Normal Models," presented by Satyanarayana Mallya and Robert Jannarone, Dept. of Electrical & Computer Engineering, University of South Carolina, at the Twenty–Third Southeastern Symposium on System Theory, 1991. Pp. 580–583 of the Symposium Proceedings published by the IEEE Computer Society Press, P O Box 3014, Los Alamitos, California, 90720–1264.

"Real–Time Pattern Recognition, II: Visual Conjunctoid Neural Networks," presented by Yalin Nu, Keping Ma, & Robert Jannarone, Dept. of Electrical & Computer Engineering, University of South Carolina, at the Twenty–Third Southeastern Symposium on System Theory, 1991. Pp. 584–589 of the Symposium Proceedings published by the IEEE Computer Society Press, P O Box 3014, Los Alamitos, CA 90720–1264.

"Real–Time Neural Networks, III: Alternative Neural Networks for Speech Applications," presented by Günhan Tatman & Robert Jannarone, Dept. of Electrical & Computer Engineering, University of South Carolina, at the Twenty–Third Southeastern Symposium on System Theory, 1991. Pages 591–595 of the Symposium Proceedings published by the IEEE Computer Society Press, P O Box 3014, Los Alamitos, California, 90720–1264.

"Real–Time Neural Networks: Conjunctoid Parallel Implementation," presented by Piyush Mehta & Robert Jannarone, Dept. of Electrical & Computer Engineering, University of South Carolina, at the Twenty–Third Southeastern Symposium on System Theory, 1991. Pp. 597–601 of the Symposium Proceedings published by the IEEE Computer Society Press, P O Box 3014, Los Alamitos, California, 90720–1264.

"The BSP400: A Modular Neurocomputer," by Jan N.H. Heemskerk, Jaap Hoekstra, Jacob M.J. Murre, Leon H.J.G. Kemna, & Patrick T.W. Hudson, in *Mircroprocessors and Microsystems*, vol. 18, No. 2, Mar. 1994, pp. 67–78.

"Multiprocessor Simulation of Neural Networks with NERV," by R. Männer, H. Horner, R. Hauser, & A. Genthner, pp. 457–465 in Proceedings: Supercomputing '89, Nov. 13–17, 1989, Reno, Nevada, USA, sponsored by IEEE Computer Society and ACM SIGARCH.

"VLSI Architectures for Neural Networks," by Philip Treleaven, Marco Pacheco, & Marley Vellasco, in *IEEE Micro*, vol. 9, No. 6, Dec. 1989, pp. 8–27.

* cited by examiner

US 6,647,377 B2

MULTI-KERNEL NEURAL NETWORK CONCURRENT LEARNING, MONITORING, AND FORECASTING SYSTEM

CROSS REFERENCE TO RELATED APPLICATION

This application is a continuation of of U.S. patent application Ser. No. 08/974,377, filed Nov. 19, 1997, now U.S. Pat. No. 6,216,119 which is hereby incorporated by reference in its entirety.

TECHNICAL FIELD

This invention relates to neural network information processing systems and, more particularly, relates to a multi-kernel neural network computing architecture configured to learn correlations among feature values as the network monitors and imputes measured input values and also predicts future output values.

BACKGROUND OF THE INVENTION

During the on-going boom in computer technology, much of the attention has focused on sequential information processing systems, such as those found in a wide range of computing systems ranging from hand-held personal computers to large mainframe computers. In general, most "flat file" sequential information processing systems can be very effective at performing tasks for which the inputs, outputs, and operations are known in advance. But they are less well suited to performing adaptive tasks in which the inputs, outputs, and operations change over time in response to changing environmental factors, changing physical characteristics, and so forth. In other words, typical "flat file" sequential information processing systems are not well suited to performing tasks that involve learning.

Neural networks are a category of computer techniques that may be used to implement learning systems. In particular, neural network computer architectures have been developed to simulate the information processes that occur in thinking organisms. Neural network techniques are often implemented using dedicated hardware processors, such as parallel-processing logic arrays. Generally described, a neural network is a system of interconnected nodes having inputs and outputs in which an output of a given node is driven by a weighted sum of the node's inputs. A neural network is well suited to monitoring, forecasting, and control applications in which the input and output values correspond to physical parameters that can be measured during a series of time trials. Monitoring and forecasting the same values allows the relationships among the input and output values to be learned through empirical analysis applied to measured input and output values. The learned relationships may then be applied to predicted output values from measured input values.

To apply a typical neural network system to a physical application, the neural network is configured with appropriate inputs and outputs for the given application. Once constructed, the network is exposed during a training phase to a series of time trials including measured values for both the inputs and the outputs. Through empirical analysis during the training phase, the network learns the relationships among the measured inputs and outputs. After the network has been trained, it may be used during subsequent time trials in a predicting phase to compute predicted outputs from measured inputs. That is, during the predicting phase the network uses the measured inputs to compute predicted outputs based on the relationships learned during the training phase. In a forecasting application, the network typically receives measurements corresponding to the output values during future time trials. These measured output values are then compared to the predicted output values to measure the performance, or predicting accuracy, of the network.

The neural network may also be retrained from time to time, resulting in a training-predicting operating cycle. Although this type of conventional neural network can effectively apply learned input-output relationships to perform a predictive analysis, the network requires a distinct training phase before a predictive analysis can be performed. The network is not, in other words, capable of learning relationships during the predicting phase. By the same token, the network is not capable of conducting a predicting analysis during the training phase. This drawback limits the usefulness of conventional neural networks in certain situations.

In particular, the inability of conventional neural networks to learn and predict simultaneously limits the effectiveness of these networks in applications in which the relationships between inputs and outputs should be ascertained as quickly as possible, but it is not known how many time trials will be required to learn the relationships. In this situation, it is difficult to determine how many time trials will be adequate to train the network. Similarly, conventional neural networks are not well adapted to applications in which the relationships between inputs and outputs can change in an unknown or unpredictable way. In this situation, it is difficult to determine when to retrain the neural network.

As a result, conventional neural networks experience important limitations when applied to monitoring, forecasting, and control tasks in which the relationships between the inputs and outputs must be ascertained very quickly and in which the relationships between the inputs and outputs change in an unknown or unpredictable manner. Of course, many monitoring, forecasting, and control tasks fall into these categories. For example, machines such as missile controllers and information packet routers experience rapid changes in the input-output relationships that should be ascertained very quickly. Other monitoring and control operations involving machines that may experience fundamental failures, such as a structural member collapsing or a missile veering out of control, often exhibit input-output relationships that change in an unknown or unpredictable manner.

Conventional neural networks also experience limited effectiveness in applications in which input-output relationships change over time in response to changing factors that are unmeasured and, in many cases, unmeasurable. For example, a commodity price index can be expected to change over time in an unpredictable manner in response to changing factors such as inventory levels, demand for the commodity, the liquidity of the money supply, the psychology of traders, and so forth. Similarly, the relationships between electricity demand and the weather can be expected to change over time in an unpredictable manner in response to changing factors such as demographics, the technology of heating and cooling equipment, economic conditions, and the like.

Another limitation encountered with conventional neural networks stems from the fact that the physical configuration of the network is typically tailored for a particular set of inputs and outputs. Although the network readily learns the relationships among these inputs and outputs, the network is not configured to redefining its inputs and outputs in response to measured performance. This is because the input-output connection weights applied by the network may change when the network is retrained, but the inputs and outputs remain the same. Without an effective input-output refinement process, the network cannot identify and eliminate ineffective or redundant inputs and outputs. As a result, the network cannot adapt to changing conditions or continually improve prediction for a particular application.

Interestingly, the two shortcomings associated with conventional neural networks described above—the inability to learn and predict simultaneously and the lack of an effective input-output refinement process—are shortcomings that have apparently been overcome in even the most rudimentary thinking organisms. In fact, the ability to predict and learn simultaneously is an important aspect of an awake or cognitive state in a thinking organism. And the ability to allocate increasing amounts of input-output processing capacity in response to repetition of a task is an important aspect of learning in a thinking organism. Practice makes perfect, so to speak. As a result, conventional neural networks that lack these attributes experience important limitations in simulating the intelligent behavior of thinking organisms.

Accordingly, there is a general need in the art for monitoring, forecasting, and control systems that simultaneously learn and predict. There is a further need in the art for monitoring, forecasting, and control techniques that include effective input-output refinement processes.

SUMMARY OF THE INVENTION

The present invention meets the needs described above in a multi-kernel neural network computing architecture configured to learn correlations among feature values as the network monitors and imputes measured input values and also forecasts future output values. This computing architecture, referred to as a concurrent-learning information processor (CIP), includes a multi-kernel neural network array with the capability to learn and predict simultaneously. The CIP also includes a manager and an input-output transducer that may be used for input-output refinement. These components allow the computing capacity of the multi-kernel array to be reassigned in response to measured performance or other factors. The output feature values computed by the multi-kernel array and processed by an output processor of the transducer are supplied to a response unit that may be configured to perform a variety of monitoring, forecasting, and control operations in response to the computed output values. Important characteristics of the CIP, such as feature function specifications, connection specifications, learning weight schedules, and the like may be set by a technician through a graphical user interface.

The multi-kernel array learns and predicts simultaneously in "real time" in that each kernel of the array performs a predicting-learning cycle for each time trial. The ability of the CIEP to learn and predict simultaneously in real time represents a significant advancement in neural network techniques. The ability of the manager, along with the input-output transducer, to redefine the input-output relationships of the multi-kernel array from time to time represents another significant advancement. The multi-kernel array may be organized into various types of sub-arrays to tailor the CIP to various types of physical applications. The multi-kernel array typically includes at least one monitoring sub-array and at least one forecasting sub-array. The monitoring sub-array imputes input and output feature values for the current time trial. These imputed feature values are used to compute deviance values for the current time trial and to supply imputed feature values for missing or out-of-tolerance measured input values, if necessary. The forecasting sub-array predicts output feature values for future time trials.

The operating cycle for each time trial in a multi-kernel array including a monitoring sub-array and a forecasting sub-array is imputation prediction (predicting in the monitoring sub-array), forecasting learning (learning in the forecasting sub-array), forecasting prediction (predicting in the forecasting sub-array), and imputation learning (learning in the monitoring sub-array). This sequence allows the monitoring sub-array to perform its imputing function for the current time trial before learning, and then allows the forecasting sub-array to learn from the current time trial before predicting. Learning in the monitoring sub-array is delayed until after the forecasting sub-array has completed its cycle to speed the availability of the predicted output values.

Monitoring and forecasting kernels may be grouped into sub-arrays to tailor the CIP to various physical applications. For example, the organization of the multi-kernel array may correspond to a spatial configuration of inputs and outputs, a temporal configuration of inputs and outputs, or a combined spatial and temporal configuration of inputs and outputs. As specific examples, a spatial configuration may be tailored to an image processing application, a temporal configuration may be tailored to a commodity price forecasting application, or a combined spatial and temporal configuration may be tailored to an energy demand forecasting application.

Generally described, the invention is a method for responding to computed output values that are based on measured input vales received during a current time trial and during one or more historical time trials. The measured input values are received for the current time trial, and a vector of input feature values is assembled based on the measured input values. The input feature values are provided to a multi-kernel processor. Each kernel of the processor is operative for receiving one or more of the input feature values and performing a number of operations using the input feature values.

In particular, each kernel retrieves connection specifications defining mathematical relationships for computing one or more output feature values based on the received input feature values. The kernel also retrieves a set of connection weights representing regression coefficients among the received input feature values and the computed output feature values. The kernel also retrieves a set of learning weights defining mathematical relationships for updating the connection weights based on the received input feature values. The kernel then computes the output feature values based on the received input feature values, the connection weights, and the connection specifications.

The kernel also computes updated connection weights based on the received input feature values, the connection weights, the connection specifications, and the learning weights. The connection weights may define the elements of an inverse covariance matrix, and the step of computing the updated connection weights may include updating the inverse covariance matrix. Alternatively, the step of computing the updated connection weights may include updating a covariance matrix corresponding to the inverse covariance matrix and then inverting the updated covariance matrix.

The output feature values typically include imputed output feature values for the current time trial and predicted output feature values for future time trials. Each kernel provides access to its output feature values. This allows a vector of computed output values to be assembled based on the output feature values computed by each kernel. An operation, such as a deviance operation or a control operation, is then performed in response to the vector of computed output values.

According to an aspect of the invention, the vector of input feature values may be computed based on the measured input values and input feature specifications. For example, the input feature values may be based on algebraic combinations of measured input values, coefficients corresponding to a polynomial approximating a function defined by measured input values, coefficients corresponding to a differential equation corresponding to a function defined by measured input values, or coefficients corresponding to a frequency-domain function corresponding to a function defined by measured input values. Similarly, the output values may be computed based on the output feature values and output feature specifications. In particular, an output value may be computed by performing the mathematical inverse of a mathematical operation performed on a corresponding measured input value.

According to another aspect of the invention, the output feature values may include imputed output feature values based on the input feature values for one or more historical time trials. The output feature values may also include monitored output feature values based on the input feature values for the current time trial. Deviance values may be calculated by subtracting the imputed output feature values from the monitored output feature values. The deviance values may then be compared to threshold values to determine alarm conditions or the need to perform control operations. The output values are typically based on the monitored output feature values.

If one of the deviance values exceeds its associated threshold value, a deviance operation may be performed, such as indicating an alarm condition or basing the computed output values on the imputed output feature value rather than the monitored output feature value for the output feature value associated with the deviance value that exceeds its associated threshold value. Control operations, such as displaying a representation of the computed output values on a display device or actuating a controlled parameter to compensate for a condition indicated by the computed output values, may also be performed in response to the computed output values.

According to yet another aspect of the invention, refinement operations may be conducted. These refinement operations may include deleting ineffective input or output feature values, combining redundant input or output feature values, specifying new input or output feature values, recomputing the feature value specifications based on the measured input values and the computed output values for a plurality of time trials, recomputing the learning weights based on the measured input values and the computed output values for a plurality of time trials, recomputing the connection specifications based on the measured input values and the computed output values for a plurality of time trials, recomputing the output feature specifications based on the measured input values and the computed output values for a plurality of time trials, and reassigning functionality among the kernels.

The multi-kernel processor may include one or more monitoring sub-arrays and one or more forecasting sub-arrays. For a configuration that includes both monitoring and forecasting kernels, imputed output feature values for the monitoring sub-array are first computed based on the input feature values for one or more historical time trials, the connection weights, and the connection specifications. The updated connection weights for the forecasting sub-array are then computed based on the received input feature values for the current time trial, the connection weights, the connection specifications, the learning weights, and the imputed output feature values. Next, the output feature values for the forecasting sub-array are computed based on the input feature values for one or more historical time trials, the updated connection weights, and the connection specifications. The updated connection weights for the forecasting sub-array are then computed based on the received input feature values, the connection weights, the connection specifications, and the learning weights.

The configuration of the multi-kernel processor may be tailored to a particular physical application. For example, the multi-kernel processor may include several sub-arrays that each include one monitoring kernel and several forecasting kernels. In a first configuration, the multi-kernel processor includes an array of spatially-dedicated kernels corresponding to a spatially-contiguous field from which input values are measured and for which output valued are predicted. In this configuration, each kernel is configured to compute one of the output values based on a set of adjacent measured input values. Specifically, each kernel of the multi-kernel processor may correspond to a pixel in a visual image, each measured input value may correspond to a measured intensity of one of the pixels of the visual image, and each computed output value may correspond to a computed intensity of one of the pixels of the visual image.

In a second configuration, the multi-kernel processor includes an array of temporally-dedicated kernels corresponding to a time-based index from which input values are measured and for which output valued are predicted. In this configuration, each kernel is configured to predict a mutually-exclusive one of the time-based index values based on the measured input values. For example, each kernel of the multi-kernel processor may correspond to a mutually-exclusive time-specific forecast for a commodity price index, and each kernel may be configured to predict its corresponding mutually-exclusive time-specific price forecast based on the measured input values. In this case, the measured input values typically include the commodity price index along with price indices for currencies and other commodities.

In a third configuration, the multi-kernel processor includes several kernel groups that each include a number of temporally-dedicated kernels corresponding to a time-based index from which input values are measured and for which output valued are predicted. Each kernel group includes several individual kernels that are each configured to predict a component of a mutually-exclusive time-based index value based on the measured input values. The groups of temporarily-dedicated kernels define an array of spatially-dedicated kernel groups in which each kernel group is configured to compute a component of the time-based index. For example, the time-based index may include an electricity demand index, each kernel group may correspond to several electricity delivery points, and the measured input values may include electricity demand and a short-term weather forecast.

The invention also provides a computer system including an input processor configured to receive an iteration of the measured input values for the current time trial and to assemble a vector of input feature values based on the measured input values. The computer system also includes a multi-kernel processor coupled to the input processor and configured for receiving the vector of input feature values. Each kernel of the processor is operative for receiving one or more of the input feature values.

The kernels are also operative for retrieving connection specifications defining mathematical relationships for computing one or more output feature values based on the received input feature values. The kernels are also operative for retrieving a set of connection weights representing regression coefficients among the received input feature values and the computed output feature values. The kernels are also operative for retrieving a set of learning weights defining mathematical relationships for updating the connection weights based on the received input feature values. The kernels are also operative for computing the output feature values based on the received input feature values, the connection weights, and the connection specifications.

The kernels are also operative for computing updated connection weights based on the received input feature values, the connection weights, the connection specifications, and the learning weights. To update the connection weights, each kernel may update an inverse covariance matrix. Alternatively, each kernel may update a covariance matrix and then invert the updated covariance matrix. The kernels are also operative for storing the updated connection weights. Each kernel is also operative for providing access to the computed output feature values.

The computer system also includes an output processor coupled to the multi-kernel array and configured for assembling a vector of computed output values based on the output feature values computed by each kernel. The computer system also includes a response unit coupled to the output processor and configured for responding to the vector of computed output values.

The computer system may also include a manager configured for recomputing the learning weights based on the measured input values and the computed output values for a plurality of time trials. The manager may also be configured to recompute the connection specifications based on the measured input values and the computed output values for a series of time trials. The manager may also be configured to delete ineffective input or output feature values, combine redundant input or output feature values, specify new input or output feature values, recompute input or output feature specifications based on the measured input values and the computed output values for a plurality of time trials, and reassign functionality among the kernels.

The computer system may also include a learned parameter memory coupled to the multi-kernel array and operative for receiving the connection weights from the multi-kernel array, storing the connection weights, and providing the connection weights to the multi-kernel array. The response unit of the computer system may be operative for displaying a representation of the computed output values on a display device, indicating an alarm condition, and actuating a controlled parameter to compensate for a condition indicated by the computed output values.

That the invention improves over the drawbacks of conventional neural network systems and accomplishes the advantages described above will become apparent from the following detailed description of exemplary embodiments of the invention and the appended drawings and claims.

DETAILED DESCRIPTION OF THE PREFERRED EMBODIMENTS

Figure 1:
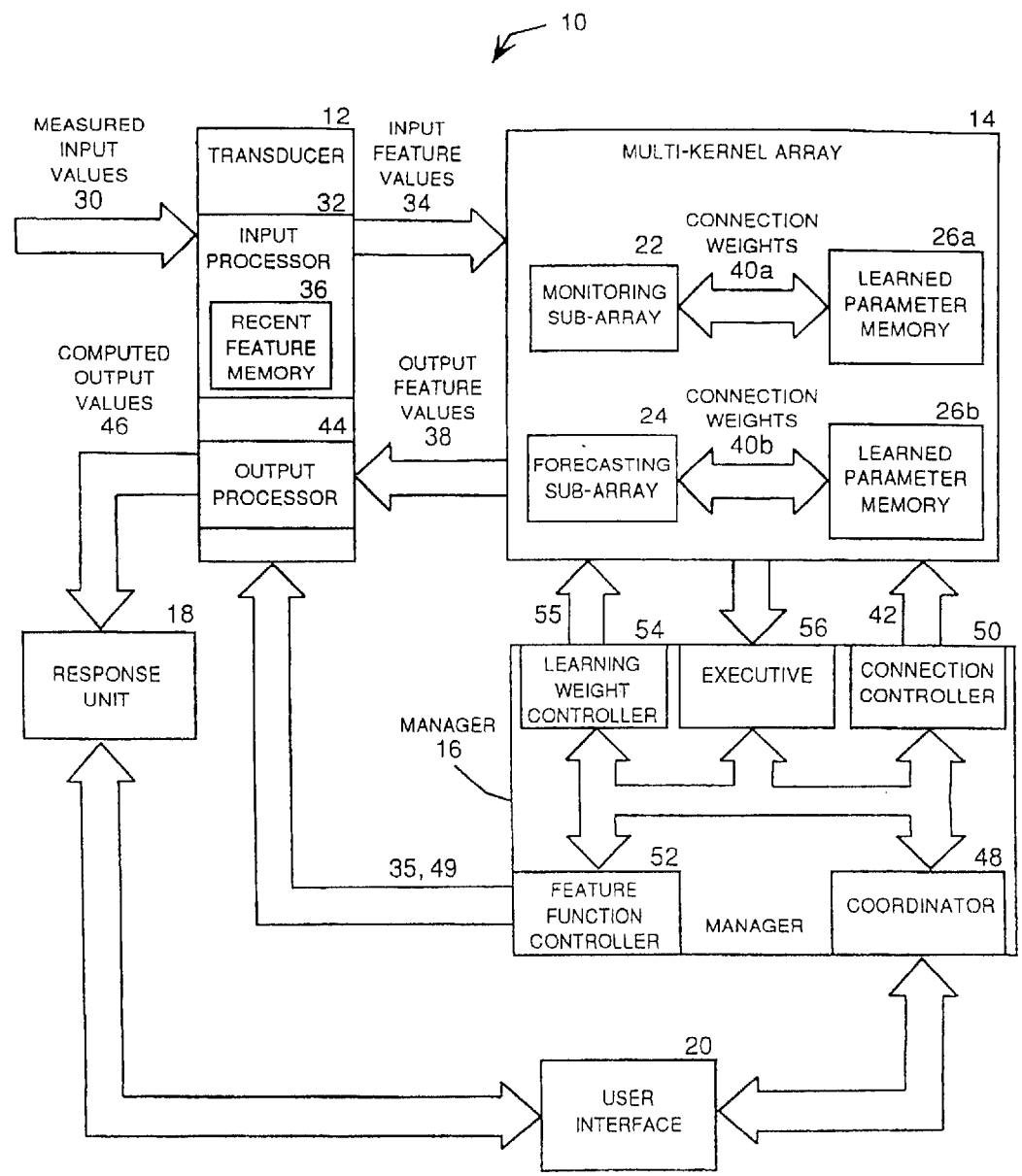
FIG. 1 is a functional block diagram of a concurrent-learning information processor in accordance with an embodiment of the invention.

The invention is a concurrent-learning information processor (CIP) that may be embodied in dedicated-hardware computing equipment or in software that runs on conventional sequential processing computing equipment. The dedicated hardware embodiments are best suited to applications that require very fast processing, whereas the software embodiments are best suited to applications that will tolerate significantly lower processing rates. In general, the software embodiments may be significantly less expensive to implement because they will run on off-the-shelf computer equipment. The hardware embodiments, on the other hand, require specially-made dedicated-hardware computing equipment. Because the CIP structure includes a manager and transducer that permit reconfiguration of input-output relationships, however, a single hardware embodiment may be configured to perform a wide range of different tasks. For this reason, both the software and the hardware embodiments may be used as multi-purpose, and in many respects general-purpose, processors.

The software embodiments are preferably configured in an object-oriented architecture in which the discrete components of the CIP are programmed in discrete objects. Each object includes a predefined interface that defines a protocol for communicating and exchanging data with the object. By configuring the software embodiment in discrete objects, each object may have a corresponding discrete physical element or group of elements in a hardware analog. This relationship between the software and hardware embodiments facilitates developing and testing models in software and, once perfected, mass producing hardware embodiments. Nevertheless, it should be understood that the invention could be embodied in other types of object-oriented architectures and could use software techniques other than object-oriented programming.

The major components of the CIP are an input-output transducer, a multi-kernel neural network array, a manager, a response unit, and a user interface. The processing sequence for a particular time trial begins when the transducer receives measured input values. The transducer includes an input processor that transforms the measured input values into input feature values in accordance with input feature specifications supplied by the manager. The multi-kernel array computes output feature values based on the input feature values, connection specifications supplied by the manager, and regression coefficients that are stored in a learned parameter memory. The output feature values are returned to the transducer, which includes an output processor that transforms the output feature values into computed output values in accordance with output feature specifications supplied by the manager. The computed output values are then transmitted to a response unit that may perform a variety of monitoring, forecasting, and control operations in response to the output values.

Each kernel of the multi-kernel array performs predicting operations and learning operations for each time trial. The array typically includes one or more monitoring kernels, referred to as a monitoring sub-array, and one or more forecasting kernels, referred to as a forecasting sub-array. The monitoring sub-array imputes input feature values and computes deviance values based on the imputed input feature values. Imputation, in this sense, means predicting the input feature values based on historical data stored in a recent feature memory. The deviance values are then computed as the difference between the imputed input feature values and the input feature values based on the measured input values for the current time trial. The deviance values are compared to tolerance values to trigger deviance operations, such as indicating an alarm condition or using an imputed feature value rather than a measured feature value in subsequent computations. Using imputed feature values in subsequent computations is particularly useful when measured input values are missing or corrupted.

The forecasting sub-array predicts output feature values for future time trials. Because the forecasting sub-array is concerned only with future time trials, it may be configured to learn from the input data for the current time trial before predicting output data for future time trials. The monitoring sub-array, on the other hand, first predicts by imputing values for the current time trial and then learns from the input data for the current time trial. Therefore, the operating cycle for each time trial processes is imputation prediction (predicting in the monitoring sub-array), forecasting learning (learning in the forecasting sub-array), forecasting prediction (predicting in the forecasting sub-array), and imputation learning (learning in the monitoring sub-array). This sequence allows the monitoring sub-array to perform its imputing function for the current time trial before learning, and then allows the forecasting sub-array to learn from the current time trial before performing its predicting function. Learning for the monitoring sub-array is delayed until after the forecasting sub-array has completed its cycle to speed the availability of the output values.

The CIP repeats the preceding operating cycle in a steady-state mode for multiple time trials until refinement operations are indicated. Many thousand operating cycle are typically repeated between refinement operations. During refinement operations, the manager may reconfigure the CIP in many ways, often in response to parameters and other instruction received through the user interface. Specifically, the manager may output descriptive statistics, delete ineffective feature values, combine redundant feature values, specify new feature values, redefine connection specifications for the multi-kernel array, redefine input feature specifications for the transducer input processor, redefine output feature specifications for the transducer output processor, redefine learning weight specifications for updating the connection weights, reconfigure the transducer functionality, and reassign the computing capacity of the multi-kernel array. The refinement operations give the CIP the ability to reconfigure itself in response to measured performance, user instructions, and other factors.

FIG. 1 and the following discussion are intended to provide a general description of a suitable computing architecture in which the invention may be implemented. The invention will be described in the context of a dedicated-hardware neural network computer or an analogous object-oriented software program that runs on an sequential processing computer. That is, the following description applies to both a dedicated-hardware neural network and to an analogous object-oriented software program. Those skilled in the art will recognize, however, that the invention also may be implemented in other types of computing systems and software architectures. Moreover, the invention may also be practiced in distributed computing environments in which tasks are performed by remote processing devices that are linked through a communications network. In a distributed computing environment such as the Internet, program modules may be located in both local and remote memory storage devices.

Exemplary embodiments of the invention are described below with reference to the appended figures. In this description, like elements are indicated by like element numbers throughout the several figures. FIG. 1 is a functional block diagram of a CIP 10. The major components of the CIP 10 are an input-output transducer 12, a multi-kernel neural network array 14, a manager 16, a response unit 18, and a user interface 20. The multi-kernel array 14 includes one or more monitoring kernels, referred to as a monitoring sub-array 22, and one or more forecasting kernels, referred to as a forecasting sub-array 24. The monitoring sub-array 22 and the forecasting sub-array 24 each have an associated learned parameter memory 26a and 26b, respectively. In fact, as shown best on FIG. 3, each kernel of each sub-array preferably has an associated learned parameter memory.

The CIP 10 receives an iteration of measured input values 30 during each of a series of time trials. The processing sequence for a particular time trial begins when the transducer 12 receives an iteration of measured input values 30. The measured input values received during each time trial can be thought of as a one-dimensional vector that forms a two-dimensional array for multiple time trials. The measured input values 30 may represent values from any of a variety of physical applications for which that the CIP 10 is configured. For example, the measured input values 30 may represent the intensity of pixels in a video image, the readings of strain gauges or tank levels, data packet routing information, commodity price and other economic indices, electricity demand and weather forecast data, and so forth.

The transducer 12 includes an input processor 32 that transforms the measured input values into input feature values 34 in accordance with input feature specifications 35 supplied by the manager 16. The input feature values 34, which represent the measured input values in subsequent processing, are used as independent variables in the multi-kernel array 14. In the simplest case, the input processor 32 may simply assemble the measured input values 30 into a vector and pass the assembled vector to the multi-kernel array 14.

In more complex cases, the input processor 32 mathematically manipulates the measured input values 30 to compute the input feature values 34. These computations are performed in accordance with input feature specifications 35 supplied by the manager 16. For example, the input feature values 34 may be based on algebraic combinations of measured input values 30, coefficients corresponding to a polynomial approximating a function defined by measured input values, coefficients corresponding to a differential equation corresponding to a function defined by measured input values, coefficients corresponding to a frequency-domain function corresponding to a function defined by measured input values, and so forth. Other types of input feature specifications may become evident to those skilled in the art as CIPs are configured for different types of specific physical applications.

Like the measured input values 30, the input feature values 34 for a particular time trial may be thought of as a one-dimensional vector. The input processor 12 stores a two-dimensional array of input feature values 34 for a series of historical time trials in a recent feature memory 36. Alternatively, the recent feature memory 36 may store a two-dimensional array of measured input values 30 for a series of historical time trials. The input processor 12 may use the historical data in the recent feature memory 36 to apply the input feature specifications 35 when computing the input feature values 34. An example of this type of input feature value computation is described below with reference to FIGS. 8A–B.

The input processor 12 may also use the historical data in the recent feature memory 36 to detect missing or corrupted input measurements. In response, the input processor 12 may ignore the corrupted input measurements and compute a value that tells the kernel array 14 that certain measurements are missing for the current time trial. For example, if multiple measured input values 30 are summed into one input feature value 34, the input processor 12 may compute a quantum count that indicates the number of valid measurements that are included in the input feature value. Alternatively, the input processor 12 may normalize the input feature values 34 to take out the effect of missing measured input values 30. The input processor 12 may then pass the normalized input feature values 34 to the kernel array 14.

The input processor 12 transmits the input feature values 34 to the multi-kernel array 14. In hardware embodiments, a separate conductor may be provided for each input feature value 34 so that the input feature values are simultaneously transmitted to a multi-kernel array 14 that operates as a parallel processing neural network. The multi-kernel array 14 computes output feature values 38 based on the input feature values 34 and connection weights 40 that are stored in the learned parameter memory 26. Because the input-output configuration of each kernel of the multi-kernel array 14 may be changed from time to time by the manager 16, the multi-kernel array 14 receives connection specifications 42 supplied by the manager 16. The connection specifications 42 typically indicate the number of inputs and outputs for each kernel, and may also determine which input feature values 34 are provided to each kernel. In hardware embodiments, therefore, the connection specifications 42 may drive logic gates that control the routing of the input feature values 34 to the various kernels of the multi-kernel array 14.

The connection weights 40 represent learned regression coefficients based on a covariance matrix that relates the output feature values 38, which are treated as dependent variables, to the input feature values 34, which are treated as independent variables. In other words, the multi-kernel array 14 computes each output feature value 38 as a weighted sum of the input feature values 34 in which the connection weights 40 are the elements of a covariance matrix. The connection weights 40 are learned through regression analysis applied to the input feature values 34 and the output feature values 38 for historical time trials. To perform connection weight learning simultaneously with output feature value prediction, during each time trial the connection weights 40 are retrieved from the learned parameter memory 26, used to predict output feature values, and updated for the new information received during the time trial. The updated connection weights 40 are then stored back in the learned parameter memory.

More specifically, each kernel of the multi-kernel array 14 applies the inverse of the covariance matrix to its respective input feature values 34 to compute its respective output feature values 38. The kernel may perform this operation by updating the covariance matrix and then inverting the updated covariance matrix. In this case, the connection weights 40 stored in the learned parameter memory 26 are based on inverting the elements of the covariance matrix. Inverting the covariance matrix, however, is a computationally intensive manipulation that is preferably avoided. Instead, the kernel may directly update the inverse covariance matrix, in which case the connection weights 40 stored in the learned parameter memory 26 are based directly on the elements of the inverse covariance matrix. Because hardware connections required to perform a matrix inversion are avoided, maintaining the inverse covariance matrix rather than the covariance matrix significantly increases the speed of kernel operations and simplifies the physical configuration of the hardware embodiments of the kernel.

Accordingly, each kernel of the multi-kernel array 14 preferably operates in a predicting-learning cycle for each time trial using an inverse covariance matrix to compute learned regression coefficients. The preferred structure of a hardware embodiment of a single kernel configured to update the inverse covariance matrix, the use of the inverse covariance matrix to compute regression coefficients, and the mathematical derivation supporting the structure, are described in the commonly owned U.S. Pat. No. 5,835,902, entitled "Concurrent Learning And Performance Information Processing System," inventor Robert J. Jannarone, filed on Nov. 2, 1994, and issued on Nov. 10, 1998. This patent, which is currently pending as U.S. patent application Ser. No. 08/333,204, is incorporated herein by reference.

The multi-kernel array 14 may be organized into various types of sub-arrays to tailor the CIP 10 to various types of physical applications. Examples of specific sub-array structures are described with reference to FIGS. 4–6, and other specific structures will become evident to those skilled in the art as they design CIP machines for different physical applications in the future. The operation of each kernel of the various sub-arrays is similar, except that operation of monitoring kernels differs somewhat from the operation of forecasting kernels. To facilitate a description of this distinction, the multi-kernel array 14 is shown in FIG. 1 with a monitoring sub-array 22 and a forecasting sub-array 24.

During each time trial, the monitoring sub-array 22 imputes input and/or output feature values 38 for the current time trial. These imputed feature values are used to compute deviance values for the current time trial and to supply imputed feature values for missing or out-of-tolerance feature values 38, if necessary. The forecasting sub-array 24 predicts output feature values for future time trials. Because the monitoring sub-array 22 imputes input and/or output feature values 38 for the current time trial, its purpose would be defeated if the monitoring sub-array 22 learned (i.e., updated its respective connection weights) before it imputed the input and/or output feature values 38 for the current time trial. For this reason, the monitoring sub-array 22 operates on a predicting-learning cycle for each time trial. The forecasting sub-array 24, on the other hand, predicts output feature values 38 for the future time trial. The forecasting sub-array 24 therefore operates on a learning-predicting cycle for each time trial because it benefits from learning from the current time trial before predicting.

In addition, the monitoring sub-array 22 preferably predicts before the forecasting sub-array 24 learns. Although the forecasting sub-array 24 preferably learns using output feature values 38 based on valid measured data for the current time trial rather than imputed output feature values 38, the monitoring sub-array 22 may detect missing or corrupted data. For the input and/or output feature values 38 corresponding to the missing or corrupted data for the current time trial, the forecasting sub-array 24 preferably learns using the imputed input and/or output feature values 38 computed by the monitoring sub-array 22 rather than input and/or output feature values 38 based on the invalid measured data. Because the imputed input and/or output feature values 38 are computed by the monitoring sub-array 22, the forecasting sub-array 24 preferably learns after the monitoring sub-array 22 preferably predicts.

To speed the availability of the predicted output feature values 24 computed by the forecasting sub-array 24, the learning phase of the predicting-learning cycle for the monitoring sub-array 22 may be delayed until the end of the learning-predicting cycle for forecasting sub-array. That is, the monitoring sub-array 22 preferably learns after the forecasting sub-array 24 completes its learning-predicting cycle for the current time trial. The resulting operating cycle for each time trial is imputation prediction (prediction phase in the monitoring sub-array 22), forecasting learning (learning phase in the forecasting sub-array 24), forecasting prediction (prediction phase in the forecasting sub-array 24), and imputation learning (learning phase in the monitoring sub-array 22).

The output feature values 38 are returned to an output processor 44 of the transducer 12 that transforms the output feature values into computed output values 46 in accordance with output feature specifications 49 supplied by the manager 16. Although the output processor 44 may perform a wide variety of operations, at least some of the operations are typically the inverse of the mathematical operations performed by the input processor 32. This allows at least some of the computed output values 46 to correspond to some of the measured input values 30. Comparing predicted values to measured values allows the CIP 10 to measure the accuracy of its predicting performance. For example, in a CIP configured to predict electricity demand based on weather forecast data, the measured input values 30 may include metered electricity demand data and weather forecast data. In this case, the computed output values 46 may include predicted electricity demand data. This allows the predicted electricity demand data computed for a current time trial to be compared to the corresponding metered electricity demand data received during a future time trial. The CIP is thus configured to measure the accuracy of its electricity demand forecast.

The computed output values 46 are then transmitted to a response unit 18 that may perform a variety of monitoring, forecasting, and control operations in response to the output values. For example, the response unit 18 typically displays the computed output values 46 on a display device. Simply displaying the computed output values 46 may be sufficient for systems in which further user interpretation is appropriate before any concrete actions are taken based on the output values. For a CIP configured to predict a commodity price index, for example, a trader may refer to the output values along with other relevant information not provided by the CIP, such as the amount money available to invest, before making an investment decision.

In other situations, the response unit 18 may take actions automatically in response to the computed output values 46. The response unit 18 may automatically perform a deviance operation such as indicating an alarm condition, for instance, in response to a computed output value 46 that is out of a predefined tolerance. The CIP 10 may automatically take other deviance operations in response to other out-of-tolerance values, such as metered input values 30 and input feature values 34. In particular, the CIP 10 may respond to an out-of-tolerance input value by using an imputed feature value rather then a feature value based on invalid measured or missing data in subsequent computations.

The response unit 18 may also be configured to take automatic control operations in response to the computed output values 46. Of course, the particular automatic control operations will depend on the physical application for which the CIP 10 has been configured. In a municipal water system, water supply valves may be automatically actuated in response to predicted tank levels. In a strain testing device, the strain-applying equipment may be automatically reversed in response to predicted strain gauge values. In a electricity demand forecasting system, electric generators may be brought on-line in response to predicted electricity demand values. Other automatic control operations appropriate for CIP systems configured for other physical applications will become evident to those skilled in the art as they design CIP machines for different physical applications in the future.

The CIP 10 repeats the learning-predicting cycle described above in a steady-state mode for multiple time trials until refinement operations are indicated. Many thousand operating cycles are typically repeated between refinement operations. During refinement operations, the manager 16 may reconfigure the CIP 10 in many ways, often in response to parameters and other instruction received through the user interface 20. To aid the user, the manager 16 may output descriptive statistics and other information to the. user interface 20 and receive user-definable values for predefined parameters through a menu-driven utility implemented by the user interface 20. The manager 16 includes a coordinator 48 that integrates the information received from the user interface 20 with the other elements of the manager 16.

The refinement operations performed by the manager 16 may be defined by a user or automatically computed by the manager 16. Refinement operations typically include deleting ineffective feature values, combining redundant feature values, and specifying new feature values. These operations are performed in a connection controller 50 that analyzes the connections weights 40. Connection weights that approach zero indicate ineffective feature values that the connection controller 50 may eliminate. Connection weights that approach the same value may indicate redundant feature value that the connection controller 50 typically replaces by single feature value having the average of the redundant values. As ineffective feature values are eliminated and redundant feature values are combined, the connection controller 50 makes feature value capacity available in the kernel array 14 and input-output capacity available in the transducer 12. The connection controller 50 may therefore be configured to automatically select new measured input values, feature values, and output values for this freed-up capacity.

These new measured input values, feature values, and output values are typically selected from a predefined list provided through the user interface 20. In this manner, the CIP 10 may be configured to systematically evaluate a large number of input-output combinations, eliminate those that are of little predictive value, and retain those that are of high predictive value. Over time, the CIP 10 may therefore identify the most useful measured inputs for given physical application from a large universe of candidate inputs. This is a powerful refinement technique in situations in which a large number of candidate inputs are available, but it is not known which input values will be of predictive value. For example, this type of refinement technique would be useful in culling through a large number of economic statistics to identify the most useful statistics for predicting the price of a particular commodity. In this situation, the CIP 10 may identify covariance relationships that are not intuitively obvious among the economic statistics and the particular commodity price.

The connection controller 50 also performs an operation referred to as "technical correction" to address numerical problems that can occur in the multi-kernel array 14 when connection weights become either too small or too large and thereby cause certain numerical values or calculations to become unstable. The connection controller 50 is configured to identify a connection weight that is tending toward an unstable state and to limit the value, typically by replacing the computed connection weight with a predefined minimum or maximum value.

The manager 16 also includes a feature function controller 52 that provides the input feature specifications 35 to the input processor 32, and the output feature specifications 49 to the output processor 44, of the transducer 12. The manager 16 also includes a learning weight controller 54 that provides learning weight schedules 55 for updating the connection weights 40. Several example learning weight schedules are described below with reference to FIGS. 7A–D. The manager 16 also includes an executive 56 that controls the timing of the operation of the various components of the CIP 10. Although the refinement operations may be automatic, the CIP 10 may also be configured to allow a technician to control the refinement operations through the user interface 20. The flexibility enabled by the user interface 20 for controlling the refinement operations may be varied depending on the user's needs.

Figure 2:
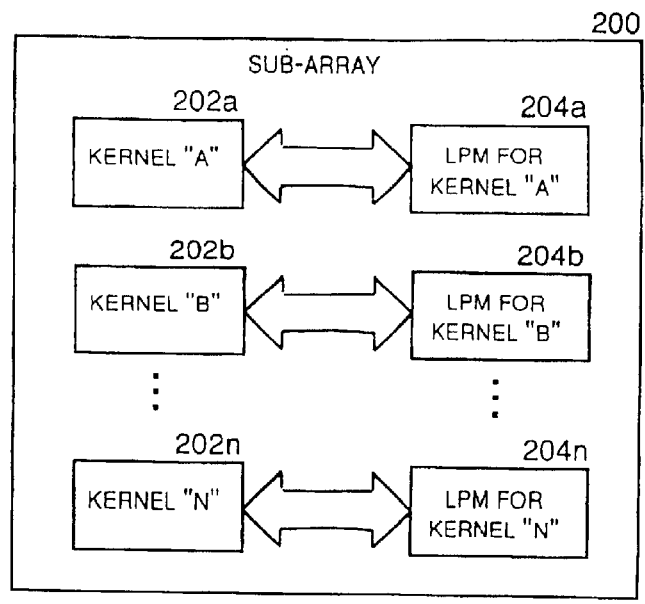
FIG. 2 illustrates a sub-array structure for a concurrent-learning information processor.

FIG. 2 illustrates a typical sub-array structure 200 for the CIP 10. The structure includes a number of kernels, represented by kernel "A" 202a through kernel "N" 202n, each with an associated learned parameter memory, represented by learned parameter memory "A" 204a through learned parameter memory "N" 204n. This sub-array structure facilitates connection weight exchange in hardware embodiments in which individual kernels and their associated learned parameter memories are located on the same chip. Because the software embodiments are preferably configured as object-oriented analogs of corresponding hardware embodiments, the sub-array structure 200 is also preferred for software embodiments of the invention. Nevertheless, other sub-array structures may be feasible for other configurations.

Figure 3:
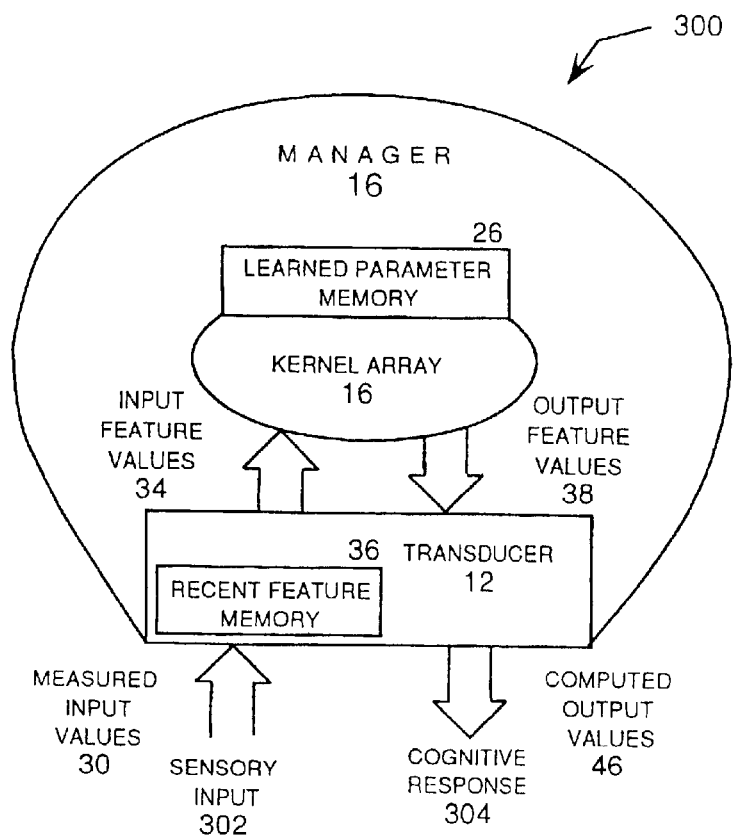
FIG. 3 illustrates an analogy between a concurrent-learning information processor and the information processes of a thinking organism.

FIG. 3 illustrates an analogy between the CIP 10 and the information processes 300 of a thinking organism. This analogy is not intended to assert that the CIP 10 functions precisely like the information processes of a thinking organism. Rather, the analogy is intended to point out some comparisons that may be instructive in understanding the CIP structure. Referring to FIGS. 1 and 3, the measured input values 30 of the CIP 10 may be analogized to the sensory input 302 of the thinking organism. The computed output values 30 of the CIP 10 may be analogized to the cognitive response 304 of the thinking organism. The recent feature memory 36 of the CIP 10 may be analogized to the short-term memory of the thinking organism. The transducer 12 of the CIP 10 may be analogized to the sensory processes of the thinking organism. The kernel array 14 may be analogized to the autonomic processes of the thinking organism. The learned parameter memory 26 may be analogized to the long-term memory of the thinking organism. And the manager 16 may be analogized to the cerebral processes of the thinking organism.

In this analogy, the steady-state learning-predicting cycle of the CIP 10 may be analogized to the awake, cognitive functions of the thinking organism. The refinement operations of the CIP 10, on the other hand, may be analogized to the functions of the thinking organism that occur during sleep. Like an awake thinking organism, the CIP 10 simultaneously learns and predicts as it receives and responds to inputs. And like an asleep thinking organism, the CIP 10 periodically refines its information processes in response to discrete units of historical experiences. And so, like a thinking organism, the life cycle of the CIP 10 is a repeating cycle of "awake" steady-state periods followed by "asleep" refinement periods.

Figure 4A:
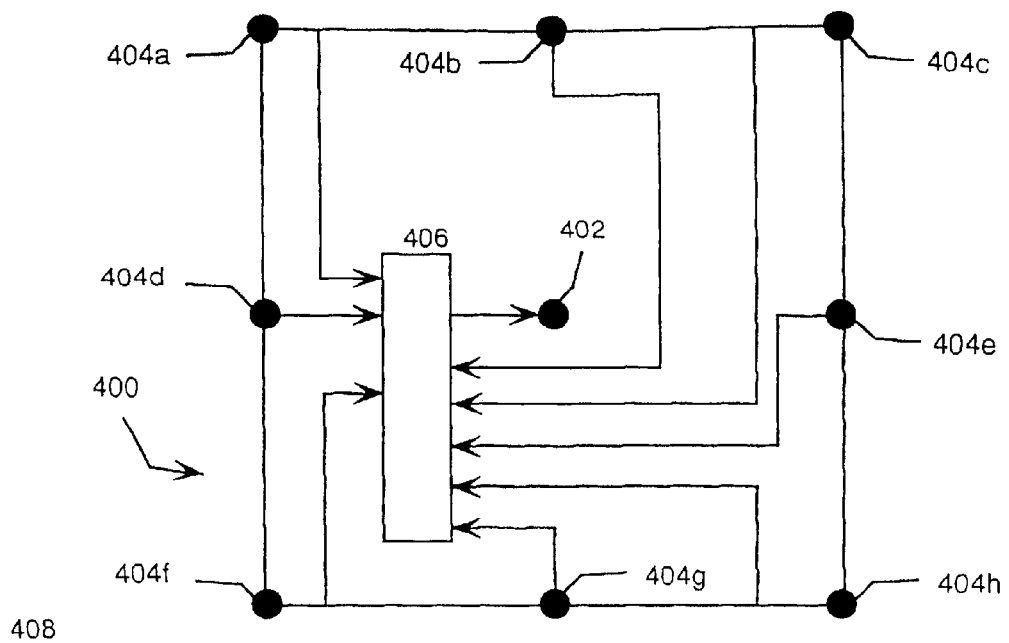
FIG. 4A illustrates a kernel of a multi-kernel array for a concurrent-learning information processor in which the kernels are organized to correspond to a spatial configuration of inputs and outputs.

FIG. 4A illustrates a kernel structure 400 for a multi-kernel array in which the kernels are organized to correspond to a spatial configuration of inputs and outputs. This type of structure may be useful for an image processing system configured to impute the intensity of pixels for which the intensity information is missing or corrupted. In a video sequence of images, for example, the image processing system uses valid data for neighboring pixels over a series of time trials, in this case video frames, to impute the value of missing or corrupted pixel data.

The kernel structure 400 is dedicated to an individual pixel 402 that is located in the center of FIG. 4A. Pixels 404a–h represent eight neighboring pixels in a raster image. The intensity of each neighboring pixel 404a–h is provided as an input to a kernel 406. The output of the kernel 406 may be used to drive the intensity of the center pixel 402. In this manner, the kernel 406 may be used to impute the intensity of the pixel 402 based on the intensities of the neighboring pixels 404a–h. This allows the kernel 406 to impute the intensity of the center pixel 402 when the measured intensity data is missing or corrupted.

Figure 4B:
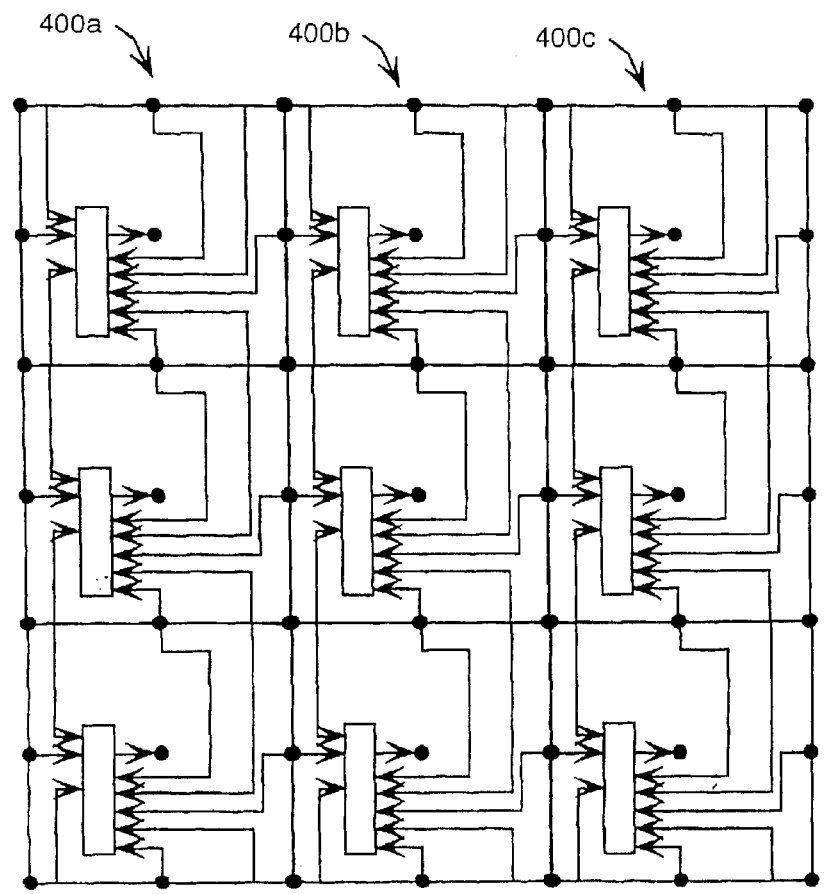
FIG. 4B illustrates a multi-kernel array for a concurrent-learning information processor in which the kernels are organized to correspond to a spatial configuration of inputs and outputs.

FIG. 4B illustrates a multi-kernel processing array 408 in which the kernel structures 400a–n are organized to correspond to a spatial configuration of inputs and outputs. Each kernel structure 400a–n is configured like the kernel structure 400 described with respect to FIG. 4A. The multi-kernel array 408 thus includes a lattice of kernel structure 400a–n that corresponds to the pixel structure of the underlying raster image. It should be understood that, for the sake of clarity in the illustration, FIG. 4B shows the kernel structure 400 for only half of the pixels of the raster image.

Figure 5:
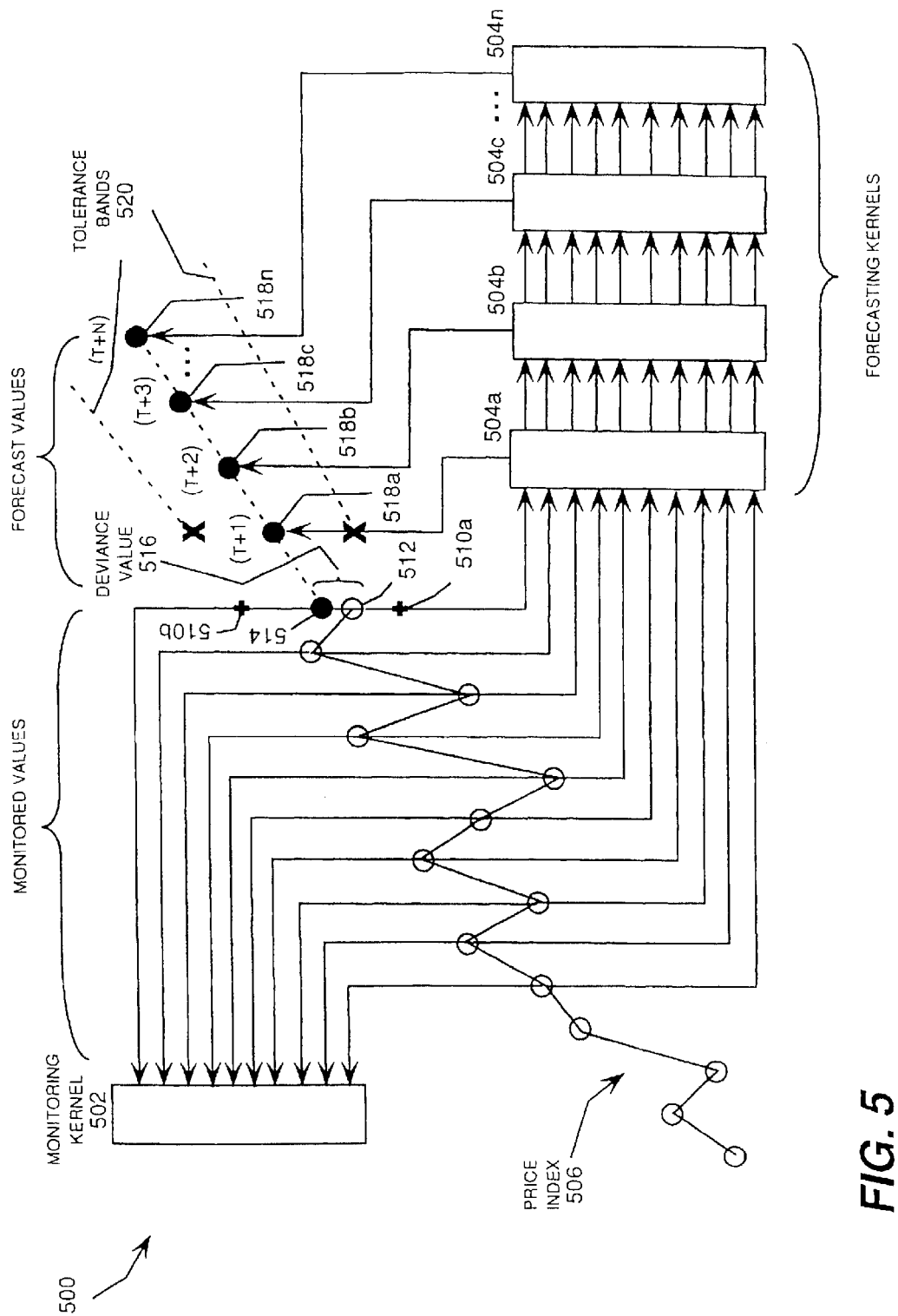
FIG. 5 illustrates a multi-kernel array for a concurrent-learning information processor in which the kernels are organized to correspond to a temporal configuration of inputs and outputs.

FIG. 5 illustrates a multi-kernel processing array 500 in which the kernels are organized to correspond to a temporal configuration of inputs and outputs. This type of structure may be useful for a commodity price forecasting system configured to predict the price of a commodity based on the historical price trend for the commodity. Although the historical price trend for the commodity is the only measured input shown in FIG. 5, other inputs, such as indices for other commodities, currencies, and other types of information could also be included.

The multi-kernel processing array 500 includes a monitoring kernel 502 and several forecasting kernels 504a–n that are each dedicated to computing the commodity price index 506 for a mutually-exclusive future time point. During a current time trial "t" for example, the monitoring kernel 502 imputes the commodity price index 506 for the current time trial, kernel 504a predicts the commodity price index for a future current time trial "t+1," kernel 504b predicts the commodity price index for another future current time trial "t+2," and so forth. The measured values are illustrated as hollow dots, and the forecast values are illustrated as solid dots.

The monitoring kernel 502 also computes tolerance values 510a–b for the imputed value 512 for the current time trial. The tolerance values 510a–b are typically computed as one or two standard deviations from the imputed value 512. The monitoring kernel 502 may also compute a deviance value 516 as the difference between the imputed value 512 and the measured value 514 for the commodity price index during the current time trial. The deviance value 516 may be used to determine when the measured value 514 is most likely missing or corrupted. In the case of a missing or corrupted measured value 514, the imputed value 512 may be used in subsequent computations, such as the computations performed by the forecasting kernels 504a–n during the current time trial. The imputed value 512 may also be used by the monitoring kernel 502 and the forecasting kernels 504a–n in subsequent time trials.

Figure 6:
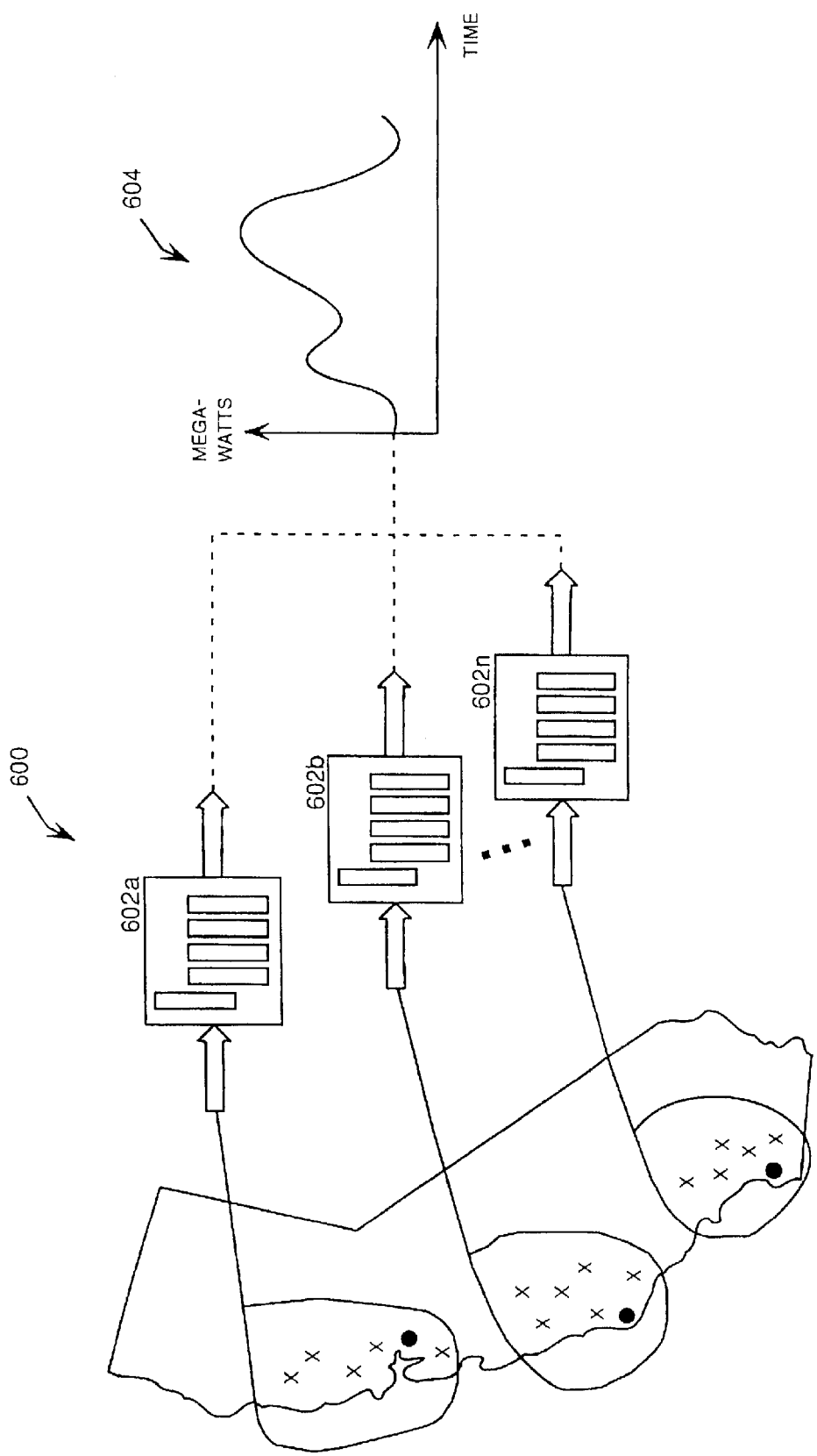
FIG. 6 illustrates a multi-kernel array for a concurrent-learning information processor in which the kernels are organized to correspond to a combined spatial and temporal configuration of inputs and outputs.

FIG. 6 illustrates a multi-kernel processing array 600 in which the kernels are organized to correspond to a combined spatial and temporal configuration of inputs and outputs. This type of structure may be useful for an electricity forecasting system configured to predict the electricity demand based on the current level of electricity demand, current weather data, and weather forecast data. The multi-kernel processing array 600 includes a group of sub-arrays 602a–n in which each sub-array includes a monitoring kernel and several forecasting kernels. Thus, each sub-array is similar in structure to the multi-kernel processing array 500 described above with reference to FIG. 5. Each sub-array 602a–n produces an electricity demand forecast for a geographic area, such as an area served by a typical electric power distribution substation or delivery point, based on metered electric demand data, metered weather data, and weather forecast data for the relevant geographic area.

Moreover, the sub-arrays 602a–n are organized in a spatial configuration similar to the kernel array 408 described with reference to FIGS. 4A–B. For the multi-kernel processing array 600, however, each subarray covers a specific geographic area. This structure may therefore be used to construct an electricity demand forecasting system for an entire electricity service area, with one sub-array assigned to each distribution substation or delivery point. The outputs of the sub-arrays 602a–n may then be summed to produce an aggregate electricity demand forecast 604 for the entire service area. It should be understood that the multi-kernel processing array 600 need not be applied to a geographically contiguous service area, but may also be used for an electricity service profile including a number of geographically separated service delivery points, such as a number of municipalities, a number of discrete business or industrial sites, a number of islands, and so forth.

FIGS. 7A–D illustrates typical learning weight schedules for updating the connection weights 40 in the CIP 10. A common learning weight schedule may be applied to all of the connection weights, an individual learning weight schedule may be applied to each individual connection weight, or the connection weights may be organized into a number of groups with each group having a common learning weight schedule.

Figure 7A:
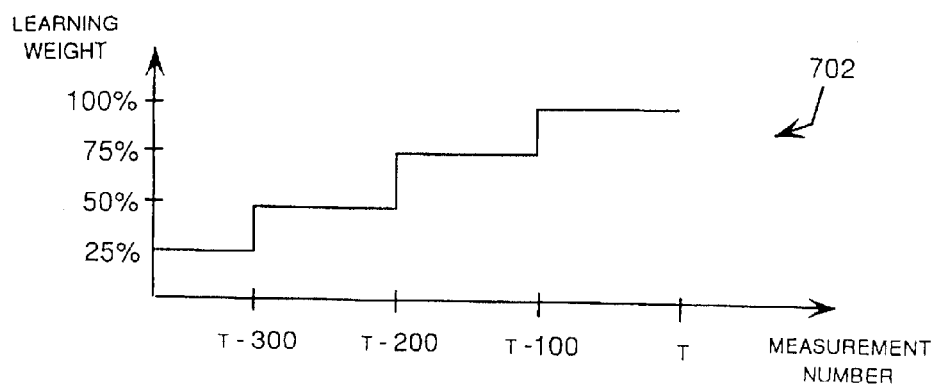
FIG. 7A illustrates a typical learning weight schedule for a concurrent-learning information processor.
Figure 7B:
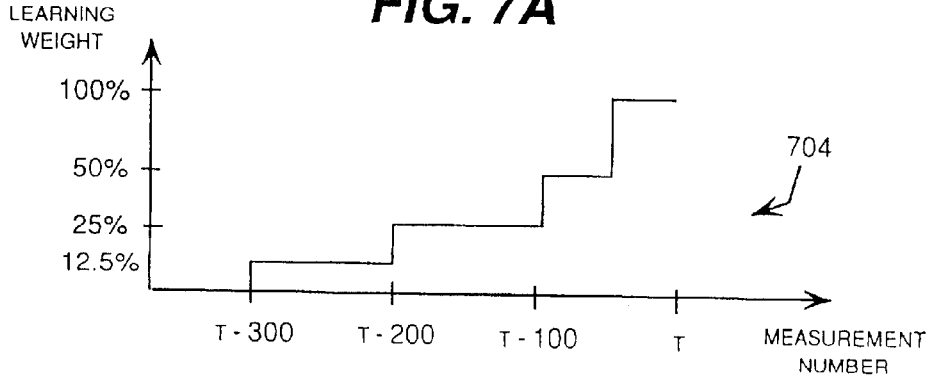
FIG. 7B illustrates a learning weight schedule for a concurrent-learning information processor in which more recent time trials are weighted more aggressively than the in the learning weight schedule of FIG. 7A.

The learning weight schedule 702 shown in FIG. 7A is an aggressive schedule in that it gives greater weight to measurements received during more recent time trials. The learning weight schedule 704 shown in FIG. 7B is more aggressive than the learning weight schedule 702 in that learning weight schedule 704 gives even greater weight to measurements received during more recent time trials. Aggressive learning weight schedules are appropriate when the computed output values tend to change relatively quickly over the number of time trials represented in the learning weight schedule.

Figure 7C:
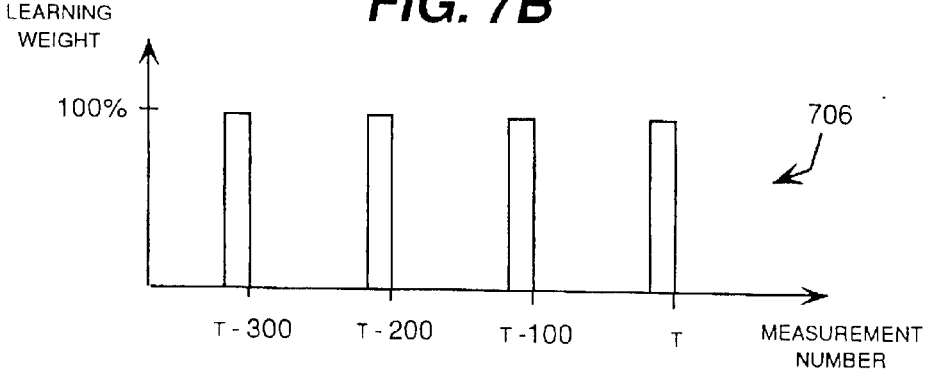
FIG. 7C illustrates a learning weight schedule for a concurrent-learning information processor in which learning is based only on certain time trials that occur on a cyclic basis.
Figure 7D:
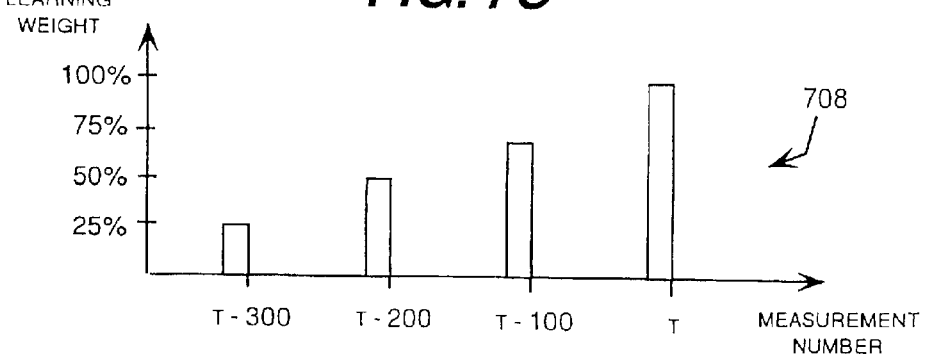
FIG. 7D illustrates the learning weight schedule of FIG. 7C modified so that more recent time trials are weighted more aggressively.

FIG. 7C illustrates a learning weight schedule 706 in which learning is based only on certain time trials that occur on a cyclic basis. This type of learning weight schedule might be appropriate for a peak load electricity forecasting system in which the weighted time trials correspond to peak load periods. FIG. 7D illustrates a learning weight schedule 708 that similar to schedule 706 except that it has been modified so that more recent time trials are weighted more aggressively. Other types of learning weight schedules will become evident to those skilled in the art as they design CIP machines for different physical applications.

Figure 8A:
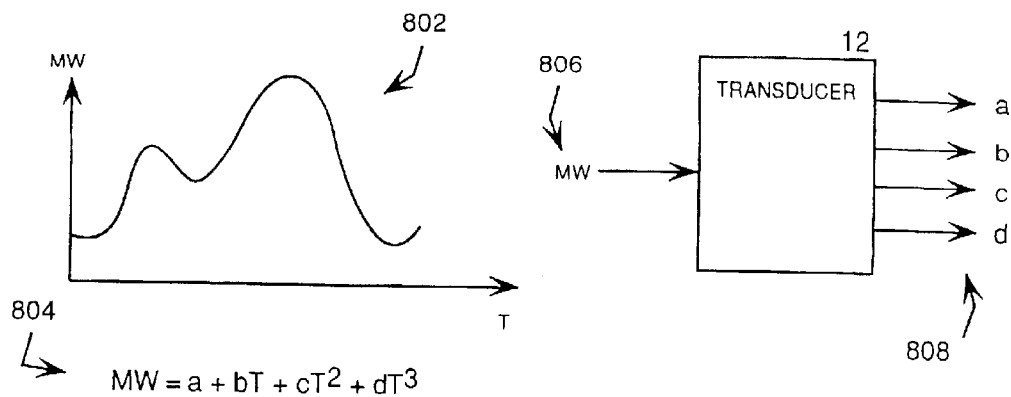
FIG. 8A illustrates a typical input feature function applied in a transducer of a concurrent-learning information processor.

FIG. 8A illustrates a typical input feature function applied in the transducer 12 of the CIP 10. In this input feature function, the input feature values correspond to the coefficients of a polynomial 804 approximating a function defined by measured input values. For example, an electricity demand signal may be a measured input value 806, and the coefficients corresponding to polynomial 804 may be the input feature values 808 computed by the transducer 12. This type of input feature function relies on measured input values over a significant number of time trials to construct a polynomial 804 of suitable length. A historical record of measured input values is therefore stored in the recent feature memory 36 shown in FIG. 1

The input feature function illustrated in FIG. 8A is appropriate for a series of measured input values that defines a repeating pattern that may be reliably approximated by a polynomial, such as an electricity demand signal for a typical geographic area. Other types of measured input values may form repeating patterns in other function domains. For this reason, the input feature values computed by the transducer 12 may correspond to the coefficients of a differential equation, a frequency-domain function, or another type of function that may be suitable for a particular measured input value.

Figure 8B:
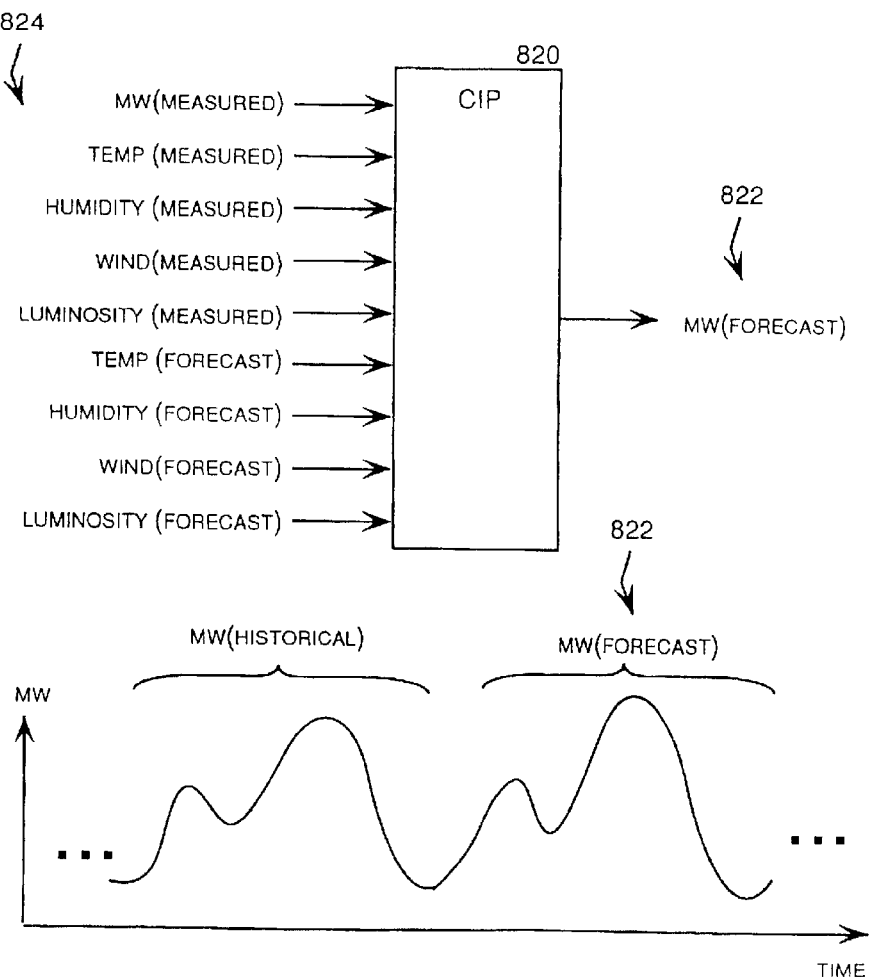
FIG. 8B illustrates a concurrent-learning information processor configured to compute electricity demand forecasts from electricity demand measurements and weather forecast data.

FIG. 8B illustrates a CIP 820 configured to compute electricity demand forecasts from electricity demand measurements and weather forecast data, which preferably includes measured current weather data and short-term weather forecast data. The CIP 820 thus produces an electricity demand forecast 822 based on input values 824 including metered electric demand data, metered weather data, and weather forecast data. The multi-kernel array structure described with reference to FIG. 6, the learning weight schedules described with reference to FIGS. 7A–D, and the input feature function 803 described with reference to FIG. 8A are presently to believed to be suitable for the electricity demand forecasting CIP 820.

Figure 9:
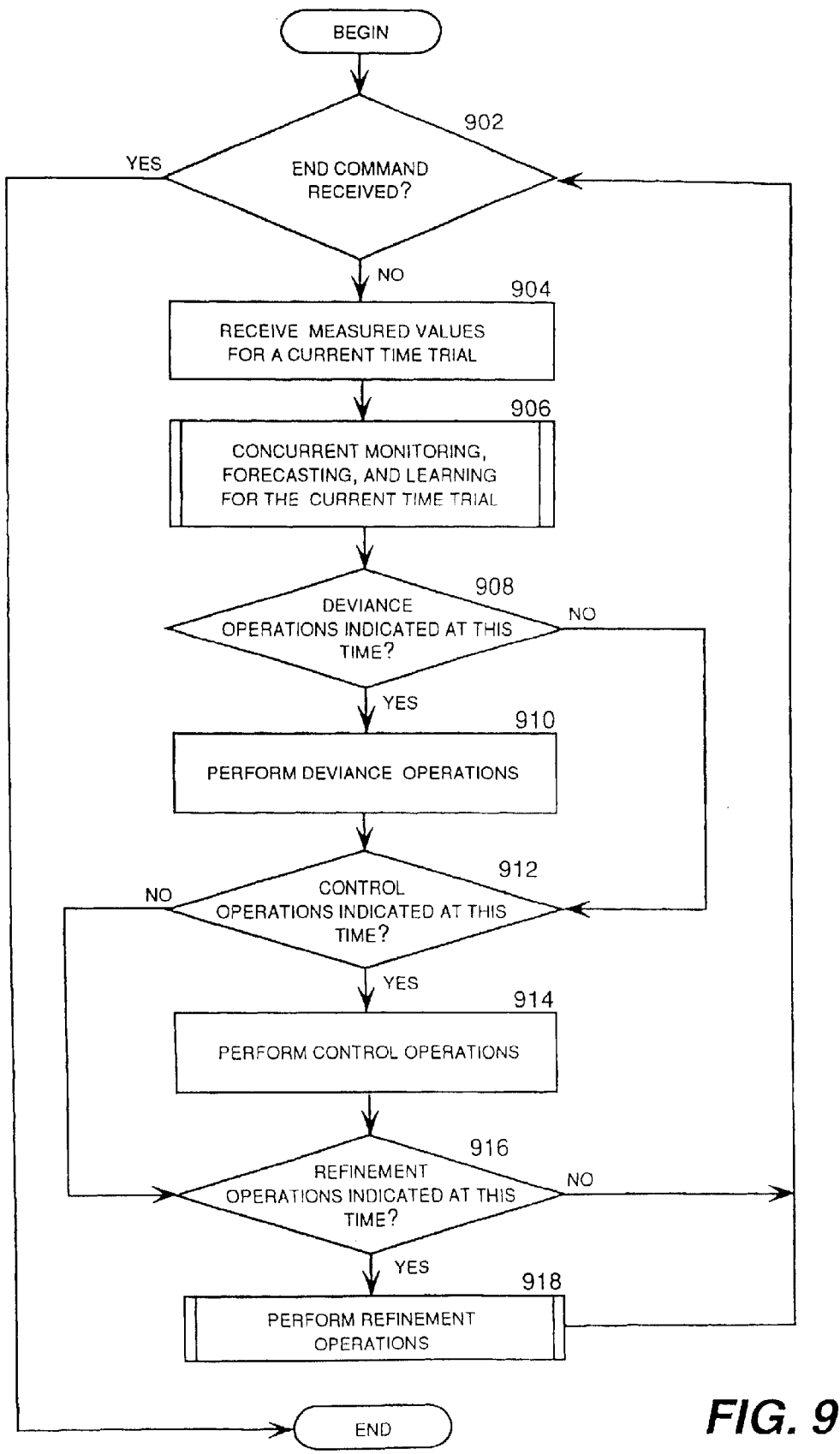
FIG. 9 is a logic flow diagram illustrating the operation of a concurrent-learning information processor.
Figure 10:
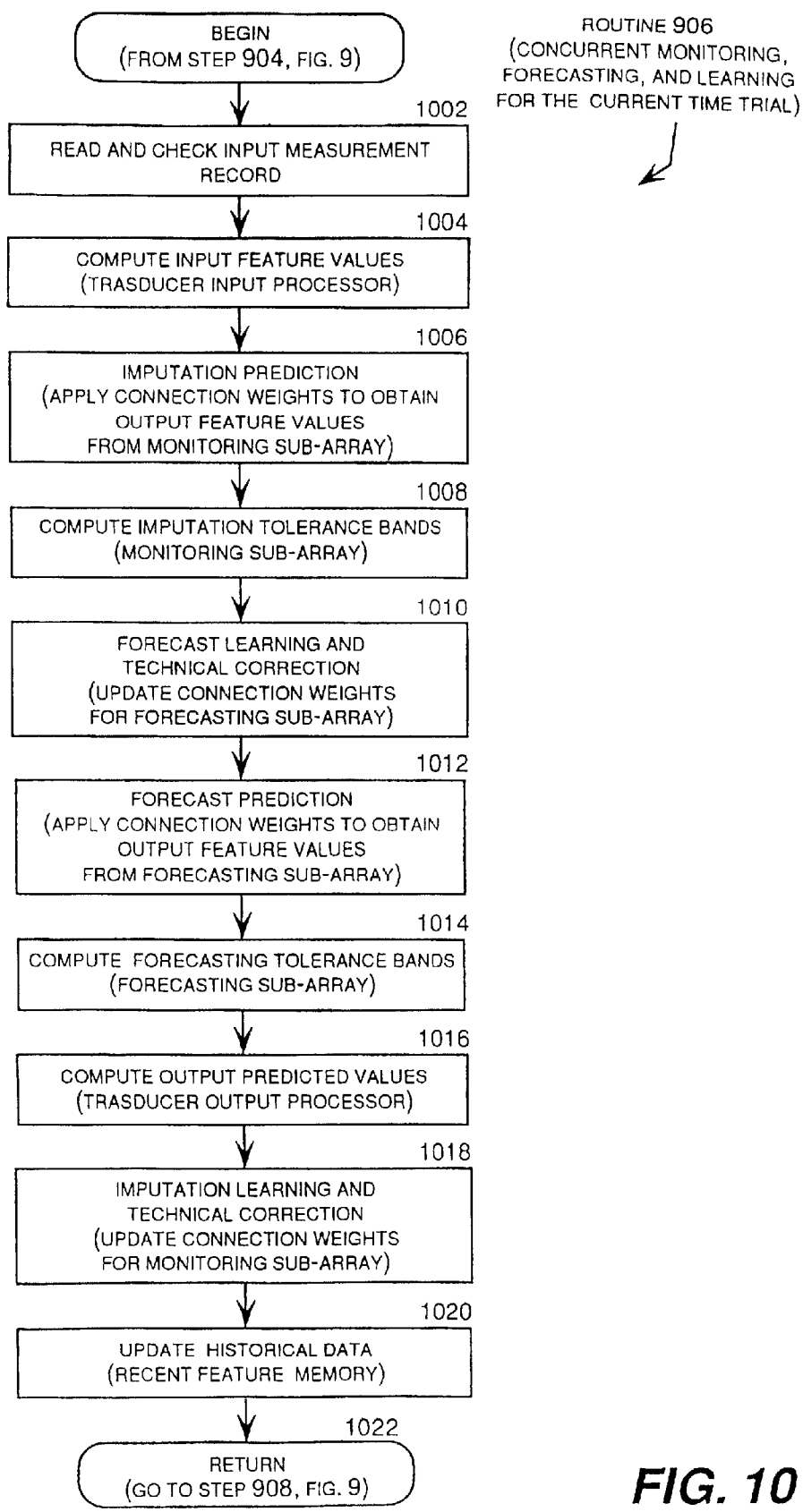
FIG. 10 is a logic flow diagram illustrating a monitoring, forecasting, and learning routine for a concurrent-learning information processor.
Figure 11:
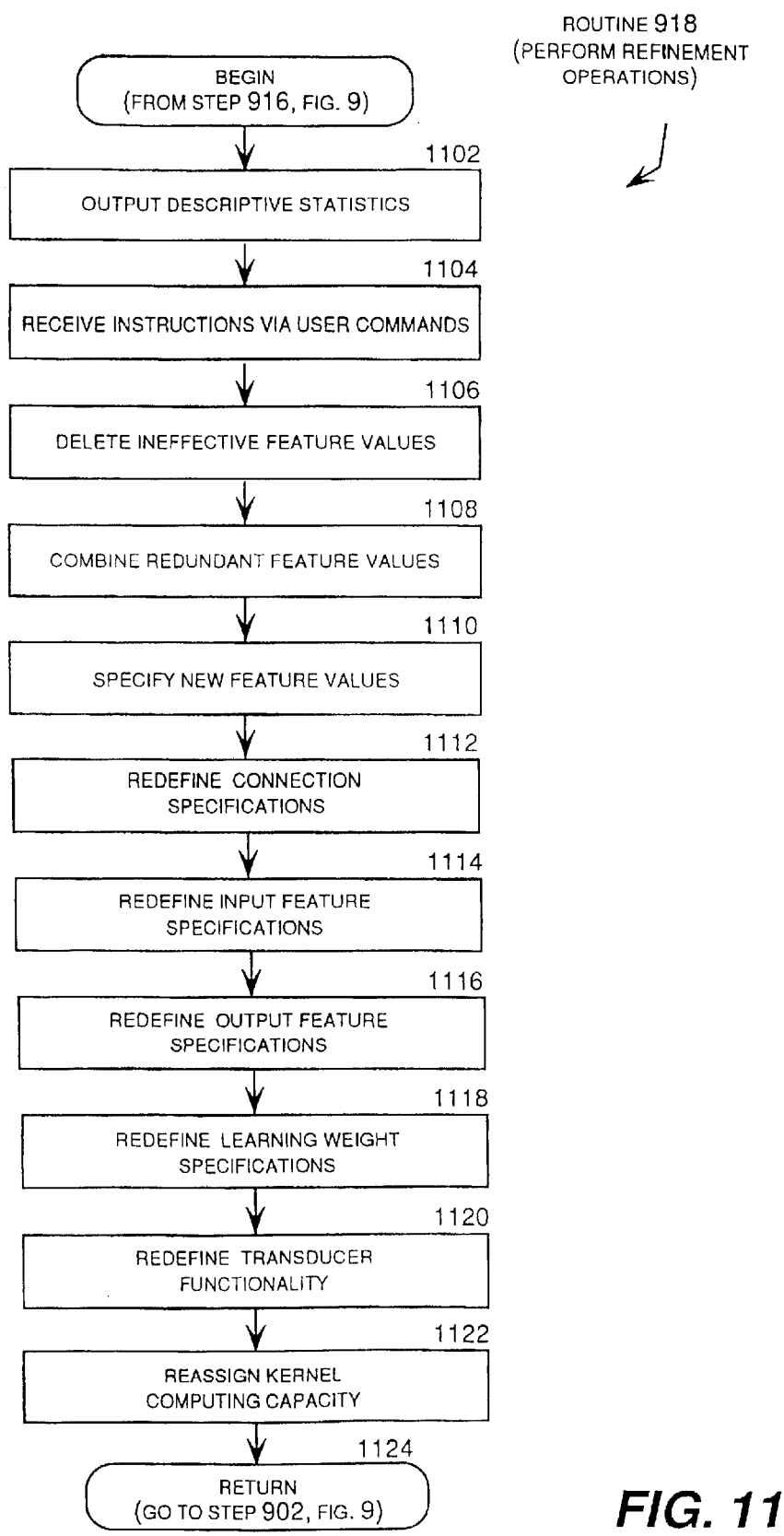
FIG. 11 is a logic flow diagram illustrating an input-output refinement routine for a concurrent-learning information processor.

FIGS. 9–11 are logic flow diagrams that illustrate the operation of the CIP 10. The description of these figures will also refer to the functional block diagram of the CIP 10 shown on FIG. 1. FIG. 9 is a logic flow diagram illustrating a typical operating routine 900 for the CIP 10. Routine 900 begins in step 902, in which the CIP 10 determines whether an end command has been received, for example by checking for an "end of file" record. Although the CIP 10 checks for the end command at the beginning of a learning-predicting cycle, this inquiry could equivalently occur at the end of the learning-predicting cycle or at other places in routine 900. For example, the CIP 10 could check for an end command that would allow processing to stop following a steady-state processing period and before the CIP 10 conducts refinement operations. If an end command has been received, the "YES" branch is followed from step 902 to the "END" step, and routine 900 terminates.

If an end command has not been received, the "NO" branch is followed from step 902 to step 904, in which the CIP 10 receives measured input values 30 for a current time trial at the input processor 32 of the transducer 12. Step 904 is followed by routine 906, in which the CIP 10 performs concurrent monitoring, forecasting, and learning operations for the current time trial. Routine 906 is described below with reference to FIG. 10.

Routine 906 is followed by step 908, in which the CIP 10 determines whether to perform deviance operations. If the CIP 10 determines that deviance operations should be conducted, the "YES" branch is followed from step 908 to the step 910, in which the CIP 10 performs the deviance operations. These deviance operations typically include indicating an alarm condition and/or using imputed or predicted values rather than measured value in subsequent computations. It should be understood that a deviance operation (e.g., using an imputed feature value rather than a feature value based on a measured input value in subsequent computations) may also occur after the imputing phase in the monitoring sub-array 22 and before the learning phase in the forecasting sub-array 24.

If the CIP 10 determines in step 908 that deviance operations should not be conducted, the "NO" branch is followed to step 912, in which the CIP 10 determines whether control operations should be conducted, typically by the response unit 18. Step 912 also follows the step 910. If the CIP 10 determines that control operations should be conducted, the "YES" branch is followed from step 912 to the step 914, in which the CIP 10 performs the control operations. These control operations typically include displaying the predicted output values 46 and may also include taking automatic response actions, such as opening valves, altering data packet routing instructions, actuating switches, and the like.

If the CIP 10 determines in step 912 that control operations should not be conducted, the "NO" branch is followed to step 916, in which the CIP 10 determines whether refinement operations should be conducted by the manager 16. Step 916 also follows the step 914. If the CIP 10 determines that refinement operations should be conducted, the "YES" branch is followed from step 916 to the routine 918, in which the CIP performs the control operations. Routine 918 is described below with reference to FIG. 11. Following routine 918, routine 900 loops to step 902, and routine 900 repeats in a steady-state mode for another time trial.

FIG. 10 is a logic flow diagram illustrating routine 906 for monitoring, forecasting, and learning in the CIP 10. Routine 906 follows step 904 shown on FIG. 9. In step 1002, the CIP 10 reads and checks a record including measured input values 30 for the current time trial. If the check conducted in step 1002 indicates that the record is invalid, routine 906 may skip the record, abort processing, indicate an alarm condition, or take other predefined actions. Step 1002 is followed by step 1004, in which the input processor 32 of the transducer 12 assembles a vector of input feature values 34 based on the measured input values 30 and input feature specifications 35 provided by the feature function controller 52. Typical input feature specifications are described above with reference to FIG. 8A.

Step 1004 is followed by step 1006, in which the monitoring sub-array 22 performs imputation prediction. Step 1006 involves imputing input and/or output feature values for the current time trial. For the example shown in FIG. 5, in step 1006 the monitoring sub-array 22 imputes the output feature value 512 for the current time trial. To impute the input and/or output feature values for the current time trial, the monitoring sub-array 22 retrieves the connection weights 40a from the learned parameter memory 26a and applies the connection weights 40a to the input feature values 34 to compute imputed output feature values 38.

Step 1006 is followed by step 1008, in which the monitoring sub-array 22 computes tolerance bands for imputed feature values. For the example shown in FIG. 5, in step 1008 the monitoring sub-array 22 computes the tolerance values 514a–b for the current time trial. The tolerance values are typically computed as one or two standard deviations from the imputed feature values for the current time trial.

Step 1008 is followed by step 1010, in which the forecasting sub-array 24 performs learning and technical correction using the input feature values 34 for the current time trial. Step 1010 involves updating the connection weights 40b stored in the learned parameter memory 26b, preferably by updating the regression coefficients based on an inverse covariance matrix using a learning weight schedule 55 provided by the learning weight controller 54. The connection weights 40b stored in the learned parameter memory 26b preferably correspond to the regression coefficients based on the inverse covariance matrix. The forecasting sub-array 24 retrieves and updates the connection weights 40b. The updated connection weights 40b are then returned to the learned parameter memory 26b.

Before the updated connection weights 40b are returned to the learned parameter memory 26b, the connection controller 50 may perform technical correction on the updated connection weights 40b to avoid numerical problems that could otherwise stall the CIP 10. As noted previously, the connection controller 50 is configured to identify a connection weight that is tending toward an unstable state and to limit the value, typically by replacing the computed connection weight with a predefined minimum or maximum value.

Step 1010 is followed by step 1012, in which the forecasting sub-array 24 performs forecast prediction. Step 1012 involves predicting output feature values 38 for future time trials. For the example shown in FIG. 5, in step 1012 the forecasting sub-array 24 predicts the output values 518a–n for the future time trials "t+1" through "t+n." To predict the output feature values 38 for the future time trials, the forecasting sub-array 24 retrieves the updated connection weights 40b from the learned parameter memory 26b and applies the connection weights 40b to the input feature values 34 to compute the predicted output feature values 38.

Step 1012 is followed by step 1014, in which the forecasting sub-array 24 computes tolerance bands for the predicted output feature values 38. For the example shown in FIG. 5, in step 1014 the forecasting sub-array 24 computes the tolerance bands 520 for the future time trials "t+1" through "t+n." The tolerance bands are typically computed as one or two standard deviations from the predicted output values 38 for the future time trials.

Step 1014 is followed by step 1016, in which the output processor 44 of the transducer 12 computes the output values 46 based on the output feature values 38 computed by the forecasting sub-array 24 and the monitoring sub-array 22. Although the output processor 44 may perform a wide variety of operations in step 1016, at least some of the operations are typically the inverse of the mathematical operations performed by the input processor 32 in step 1004. This allows at least some of the computed output values 46 to correspond to some of the measured input values 30. Comparing predicted values to measured values allows the CIP 10 to measure the accuracy of its predicting performance.

Step 1016 is followed by step 1018, in which the monitoring sub-array 24 performs learning and technical correction using the input feature values 34 for the current time trial. Step 1018 involves updating the connection weights 40a stored in the learned parameter memory 26a, preferably by-updating the regression coefficients based on an inverse covariance matrix using a learning weight schedule 55 provided by the learning weight controller 54. The connection weights 40a stored in the learned parameter memory 26a preferably correspond to the regression coefficients based on the inverse covariance matrix. The monitoring sub-array 22 retrieves and updates the connection weights 40a. The updated connection weights 40a are then returned to the learned parameter memory 26a.

Before the updated connection weights 40a are returned to the learned parameter memory 26a, the connection controller 50 may perform technical correction on the updated connection weights 40b to avoid numerical problems that could otherwise stall the CIP 10. Step 1018 is followed by step 1020, in which the historical data in the recent feature memory 36 is updated, typically on a first-in-first-out basis.

Other parameters may be saved or updated in step 1020, as appropriate, to prepare the CIP 10 for the next time trial. Step 1020 is followed by step 1022, which returns to step 908 shown on FIG. 9.

FIG. 11 is a logic flow diagram illustrating the input-output refinement routine 918 for the CIP 10. Routine 918 follows step 916 shown on FIG. 9. It should be understood that all of the steps of routing 918 are not necessarily performed each time the CIP 10 performs refinement operations. Rather, routine 918 is as a list of refinement operations that the CIP 10 may perform, as needed. The need for a particular refinement operation may be determined automatically by the manager 16, or may be determined by a user and communicated to the CIP 10 via the user interface 20. Varying levels of flexibility may be enabled by the user interface 20 for refinement operations, depending on the user's needs.

In step 1102, the coordinator 48 of the manager 16 outputs descriptive statistics to the user interface 20. Step 1102 is followed by the step 1104, in which the coordinator 48 receives user-defined instructions and other parameters from the user interface 20. Step 1104 is followed by step 1106, in which the connection controller 50 deletes ineffective feature values. Step 1106 is followed by the step 1108, in which the connection controller 50 combines redundant feature values. Step 1108 is followed by the step 1110, in which the connection controller 50 specifies new feature values.

As ineffective feature values are eliminated and redundant feature values are combined, the connection controller 50 makes feature value capacity available in the kernel array 14 and input-output capacity available in the transducer 12. The connection controller 50 may therefore be configured to automatically select new measured input values, feature values, and output values for this freed-up capacity. These new measured input values, feature values, and output values are typically selected from a predefined list provided through the user interface 20. In this manner, the CIP 10 may be configured to systematically evaluate a large number of input-output combinations, eliminate those that are of little predictive value, and retain those that are of high predictive value. Over time, the CIP 10 may therefore be configured to identify the most useful measured inputs for given physical application from a large universe of candidate inputs.

Accordingly, step 1110 is followed by step 1112, in which the connection controller 50 redefines the connection specifications 42. Step 1112 is followed by step 1114, in which the feature function controller 52 redefines the input feature specifications 35. The feature function controller 52 transmits the new input feature specifications 35 to the input processor 32 of the transducer 12. Step 1114 is followed by step 1116, in which the feature function controller 52 redefines the output feature specifications 49. The feature function controller 52 transmits the new output feature specifications 49 to the output processor 44 of the transducer 12. Step 1116 is followed by step 1118, in which the learning weight controller 54 redefines the learning weight schedules 55.

In view of the wide range of refinement operations described above, it will be appreciated that the manager 16 is operative to significantly reconfigure the functionality of the transducer 12, and to significantly reconfigure the connections of the multi-kernel array 14. In other words, the totality of the refinement operations described above allow the manager 16 to fundamentally reconfigure the CIP 10 for different physical applications. This flexibility is represented by step 1120, in which the manager 16 reconfigures the functionality of the transducer 12, and step 1120, in which the manager 16 reassigns the computing capacity of the multi-kernel array 14. Step 1122 is followed by step 1124, which returns to step 902 shown on FIG. 9.

The present invention thus provides a multi-kernel neural network monitoring, forecasting, and control system that simultaneously learns and predicts in real time. The system includes effective input-output refinement processes that allow the system to reconfigure itself in response to measured performance and other factors. The refinement processes also allow the system be reconfigured in accordance with user commands for application to different physical applications. It should be understood that the foregoing pertains only to the preferred embodiments of the present invention, and that numerous changes may be made to the embodiments described herein without departing from the spirit and scope of the invention.

What is claimed is:

1. A method for determining whether refinement operations are indicated using learning correlations, comprising the steps of:

(a) receiving an iteration of measured input values for a current time trial;

(b) providing a vector of input feature values based on the measured input values to a multi-kernel processor, each kernel of the processor operative for:
   receiving one or more of the input feature values,
   retrieving connection specifications, connection weights, and learning weights, and
   computing output feature values based on the received input feature values, the connection weights, and the connection specifications;

(c) responding to a vector of computed output values based on the output feature values computed by each kernel; and (d) determining whether the refinement operations are indicated using the learning correlations and based on the output feature values.

2. The method of claim 1, wherein providing a vector of input feature values includes computing the input feature values based on the measured input values and input feature specifications.

3. The method of claim 2, wherein computing the input feature values comprises a mathematical operation selected from the group including:
   computing the input feature values based on algebraic combinations of the measured input values;
   computing input feature values based on coefficients corresponding to a polynomial approximating a function defined by the measured input values;
   computing input feature values based on coefficients corresponding to a differential equation corresponding to the function defined by measured input values; and
   computing input feature values based on coefficients corresponding to a frequency-domain function corresponding to a function defined by the measured input values.

4. The method of claim 2, wherein responding to a vector of computed output values includes computing the output values based on output feature values and output feature specifications.

5. The method of claim 4, if refinement operations are indicated, further comprising performing one or more refinement operations selected from the group including.

deleting ineffective input or output feature values;
combining redundant input or output feature values;
specifying new input or output feature values;
recomputing the input feature specifications based on the measured input values and the computed output values for a plurality of time trials;
recomputing the learning weights based on the measured input values and the computed output values for a plurality of time trials;
recomputing the connection specifications based on the measured input values and the computed output values for a plurality of time trials;
recomputing the output feature specifications based on the measured input values and the computed output values for a plurality of time trials; and
reassigning functionality among the kernels.

6. The method of claim 4, wherein computing the output feature values includes:
   imputing out feature values for a current time trial based on input feature values for one or more historical time trials,
   computing monitored output feature values based on the input feature values for the current time travel;
   computing deviance values based on the imputed output feature values and the monitored output feature values; and
   basing the computed output values on the monitored output feature values.

7. The method of claim 6, wherein responding to the vector of computed output values includes:
   comparing each deviance value to an associated threshold values; and
   if one of the deviance values exceeds its associated threshold value, performing one or more deviance operation selected from the group including,
   indicating an alarm condition, and
   basing the computed the output values on the imputed output feature values rather than the monitored the output feature values for the output feature value associated with the deviance value that exceeds its associated threshold value.

8. The method of claim 1, wherein computing output feature values includes predicting output feature values for future time trials.

9. The method of claim 1, wherein computing output feature values includes:
   imputing output feature values for the current time trial based on the input feature values for one or more historical time trials; and
   predicting output feature values for future time trials.

10. The method of claim 1, wherein responding to the vector of computed output values includes performing one or more control operations selected from the group including:
   displaying a representation of the computed output values on a display device, and
   actuating a controlled parameter to compensate for a condition indicated by the computed output values.

11. The method of claim 1, wherein the multi-kernel processor comprises:
   an array of spatially-dedicated kernels corresponding to a spatially-contiguous field from which input values are measured and for which output values are predicted; and
   each kernel configured to compute one of the computed output values based on a set of adjacent measured input values.

12. The method of claim 11, wherein:

each kernel of the multi-kernel processor corresponds to a mutually-exclusive time-specific price forecast based on the measured input values; and each kernel configured to predict its corresponding mutually-exclusive time-specific price forecast based on the assured input values.

13. The method of claim 1, wherein:

each kernel of the multi-kernel processor corresponds to a pixel in a visual image;

each measured input value corresponds to a measured intensity of one of the pixels in the visual image; and each computed output value corresponds to a computed intensity of one of the pixels of the visual image.

14. The method of claim 1, wherein the multi-kernel processor comprises:

an array of temporally-dedicated kernels corresponding to a time-based index from which input values are measured and for which output values are predicted; and each kernel configured to predict a mutually-exclusive one of the time-based index values based on the measured input values.

15. The method of claim 14, wherein the measured input values comprise:

the commodity price index; and price indices for currencies and other commodities.

16. The method of claim 1, wherein the multi-kernel processor comprises:

a plurality of kernel groups each comprising a plurality of temporally-dedicated kernels corresponding to a time-based index from which input values are measured and for which output values are predicted;

each kernel group comprising a plurality of individual kernels, each configured to predict a component of a mutually-exclusive time-based index value based on the measured input values;

the plurality of groups of temporarily-dedicated kernels defining an array of spatially-dedicated kernel groups; and each kernel group configured to compute a component of the time-based index.

17. The method of claim 1, wherein:

the time-based index comprises an electricity demand index;

each kernel group corresponds to a plurality of electricity delivery points; and the measured input values comprise electricity demand and weather data.

18. The method of claim 1, wherein:

each kernel of the processor is operative for computing updated connection weights based on the received input values, the connection weights, the connection specifications, and learning weights;

the connection weights comprise the elements of an inverse covariance matrix;

and computing updated connection weights comprise one or more steps from the group consisting of,
updating the inverse covariance matrix, and
inverting the updated covariance matrix.

19. An apparatus for determining whether refinement operations are indicated using learning correlations, comprising:

(a) means for receiving an iteration of measured input values for a current trial;

(b) means for providing a vector of input feature values based on the measured input values to a multi-kernel processor, each kernel of the processor operative for:
receiving one or more of the input feature values,
receiving correction specifications, connection weights, and learning weights, and
computing output feature values based on the received input feature values, the connection weights, and the connection specifications;

(c) means for responding to a vector of computed output values based on the output feature values computed by each kernel; and (d) means for determining whether the refinement operations are indicated using the learning correlations and based on the output feature values.

* * * * *